United States Patent [19]

Kessman et al.

[11] 4,445,147

[45] Apr. 24, 1984

[54] MERCHANDISING DEVICE HAVING RECORDING SELECTION AND DISPLAY

[76] Inventors: Loren P. Kessman, P.O. Box 95, Hamel, Ill. 62046; John W. Hawkins, 1190 Linden, Florissant, Mo. 63031

[21] Appl. No.: 287,514

[22] Filed: Jul. 27, 1981

[51] Int. Cl.³ .................... G11B 5/00; G11B 15/18
[52] U.S. Cl. ........................................ 360/12; 369/30
[58] Field of Search .............. 340/825.27, 517, 825.28; 360/12, 72.2; 369/24, 30

[56] References Cited

U.S. PATENT DOCUMENTS

| | | | |
|---|---|---|---|
| 3,983,550 | 9/1976 | Goss et al. | 360/12 |
| 4,210,785 | 7/1980 | Huber et al. | 360/12 |
| 4,276,572 | 6/1981 | Hayashi et al. | 360/12 |

Primary Examiner—Vincent P. Canney
Attorney, Agent, or Firm—Haverstock, Garrett & Roberts

[57] ABSTRACT

A record merchandising device is provided having a plurality of display racks for displaying recorded works for sale, a selection switch associated with each display rack and operable by a prospective customer, a recording medium on which is recorded portions of the recorded works displayed for sale, an electronic control having a microprocessor for locating the recorded portion of the work corresponding to the selection switch operated by a prospective customer, and a playback device for playing the recorded work portion located by the electronic control. The device also has indicator lights operable by the microprocessor for indicating which of the recorded works have been selected for playback by a customer and which recorded work is presently being played back.

36 Claims, 13 Drawing Figures

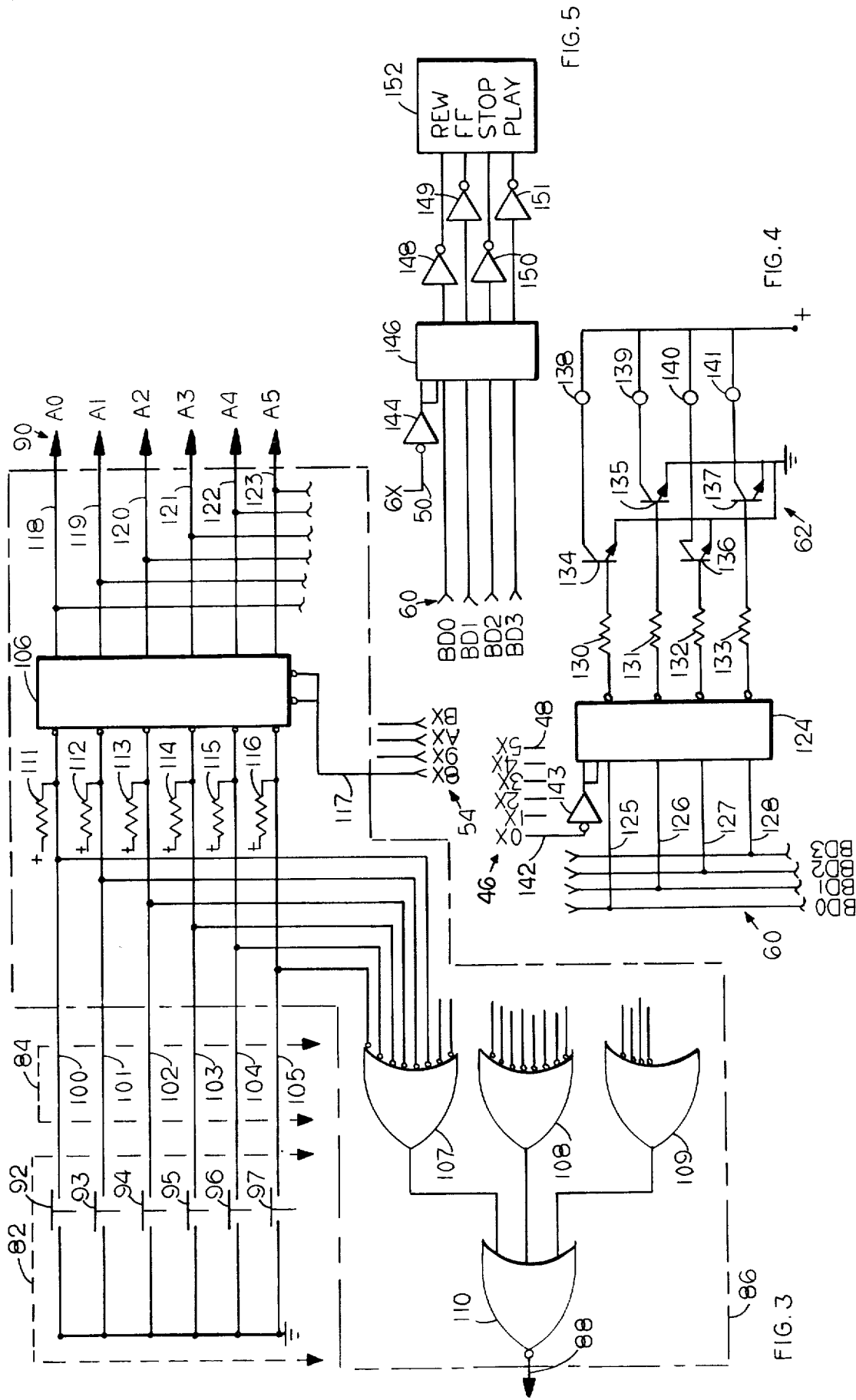

MERCHANDISING DEVICE HAVING RECORDING SELECTION AND DISPLAY

The present device relates to a record display and merchandising device having selected portions of the records displayed recorded on magnetic tape, and an electronic control for playing any one of the selected portions upon command.

Record merchandising cabinets are known having a plurality of display racks each containing a number of records offered for sale. Many times record playing equipment is available for playing a record selection so that the customer may hear a selected record before making a purchase. U.S. Pat. No. 4,225,890 issued Sept. 30, 1980 to Takenaka et al is the most pertinent known prior art and discloses a magnetic tape recorded controlled by a microprocessor chip wherein portions of the magnetic tape may be selected by counting the number of revolutions of the take-up reel or by timing the interval from the start of the tape to the selection desired.

The present invention has features which are different from anything known in the prior art including having display racks for displaying a plurality of records offered for sale and selection means associated with each display rack for selection for play of a prerecorded portion of a selected record responsive to operation of the selection means by a potential customer. The display racks may include means indicating which selection means have been activated by a potential customer and for indicating which record is presently being played. The electronic control of the device includes memory registers for storing which of the plurality of records have been selected for play, and the order in which the records were selected by the customer. The electronic control of the device plays a preselected portion of each record in a given sequence until a particular selection is requested by the potential customer. The preset sequence is then interrupted and the record portion or portions selected by the customer are then played. After all the customer selected record portions have been played, the electronic control means returns to playing the records in some preset sequence.

Other prior art devices that have been considered and are of some general interest to show the state of the art are disclosed in U.S. Pat. Nos. 3,893,177; 3,984,869 and 4,014,039.

It is a principal object of the present invention to teach the construction and operation of improved record display and merchandising means having an electronic control for playing selected portions of records displayed therein.

Another object is to teach the construction and operation of a record display and merchandising device having an electronic control for playing a selected portion of any record displayed therein.

Another object is to teach the construction and operation of electronic control means for a record display merchandising device which visually indicates which displayed record is being played.

Another object is to teach the construction of an electronic control means for a record display merchandising device which visually indicates which of the displayed records have been selected by a potential customer for playing.

Another object is to teach the construction of an electronic control means for a record display and merchandising device which sequentially plays preselected portions of the displayed record in a set sequence until at least one of the records is selected for play by a potential customer.

Another object is to teach the construction of an electronic control means for a record display and merchandising device operable for being programmed to record preselected portions of records being displayed and to play back the preselected record portions on command.

Another object is to teach the construction of an electronic control means for a record display and merchandising device which includes a magnetic tape recorder having a tape on which preselected portions of the records displayed have been recorded, logic means determining the interval to the preselected recording requested by a potential customer, and means controlling the speed of the recorder over the interval determined.

These and other objects and advantages of the present invention will become apparent after considering the following detailed specification of a preferred embodiment in conjunction with the accompanying drawings wherein:

FIG. 3 is a schematic diagram of the switch recognition control and associated selection switches of the control means of FIG. 2;

FIG. 4 is a schematic diagram of the selection indicator circuit of the control means of FIG. 2;

FIG. 5 is a schematic diagram of the tape recorder control circuit of the control means of FIG. 2;

Figure 1:
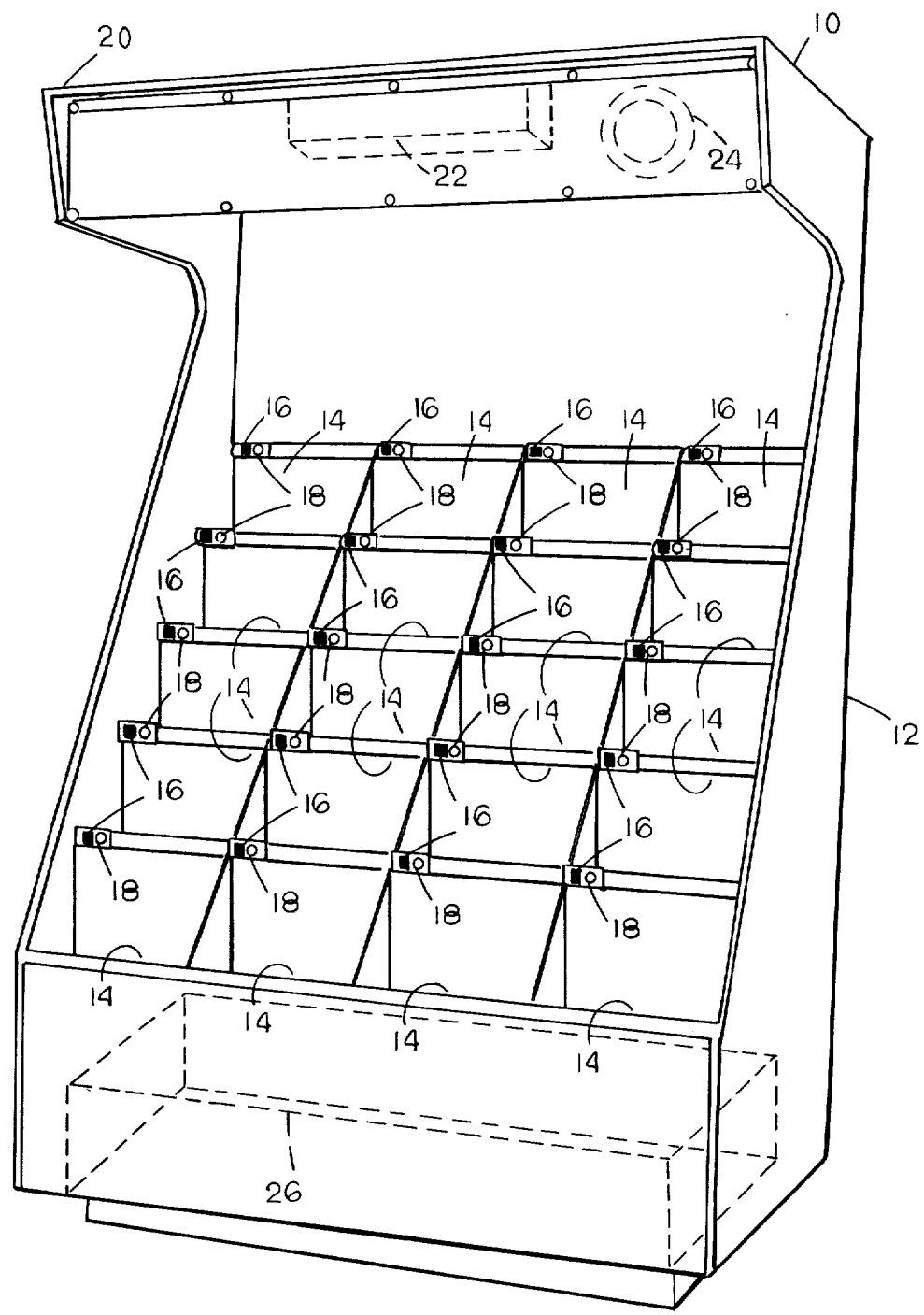
FIG. 1 is a perspective view of a record display and merchandising device constructed in accordance with the present invention.
Figure 7:
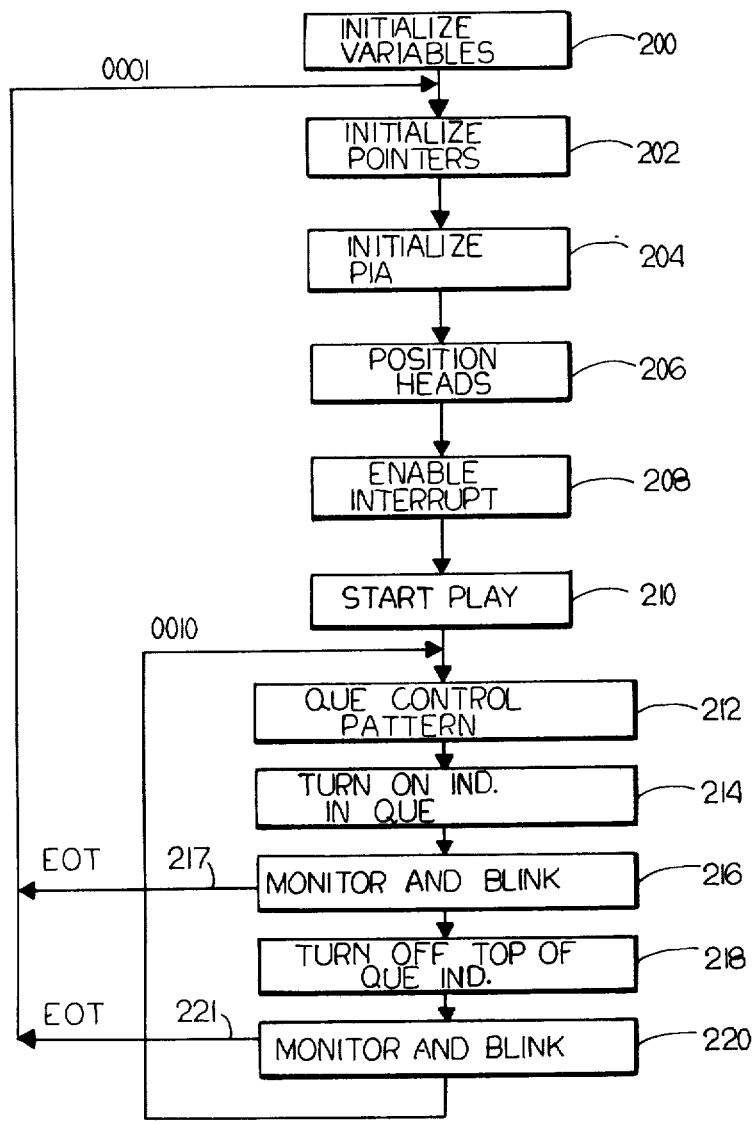
FIG. 7 is a flow chart of the main play back program usable with the device of FIG. 1.
Figure 10A:
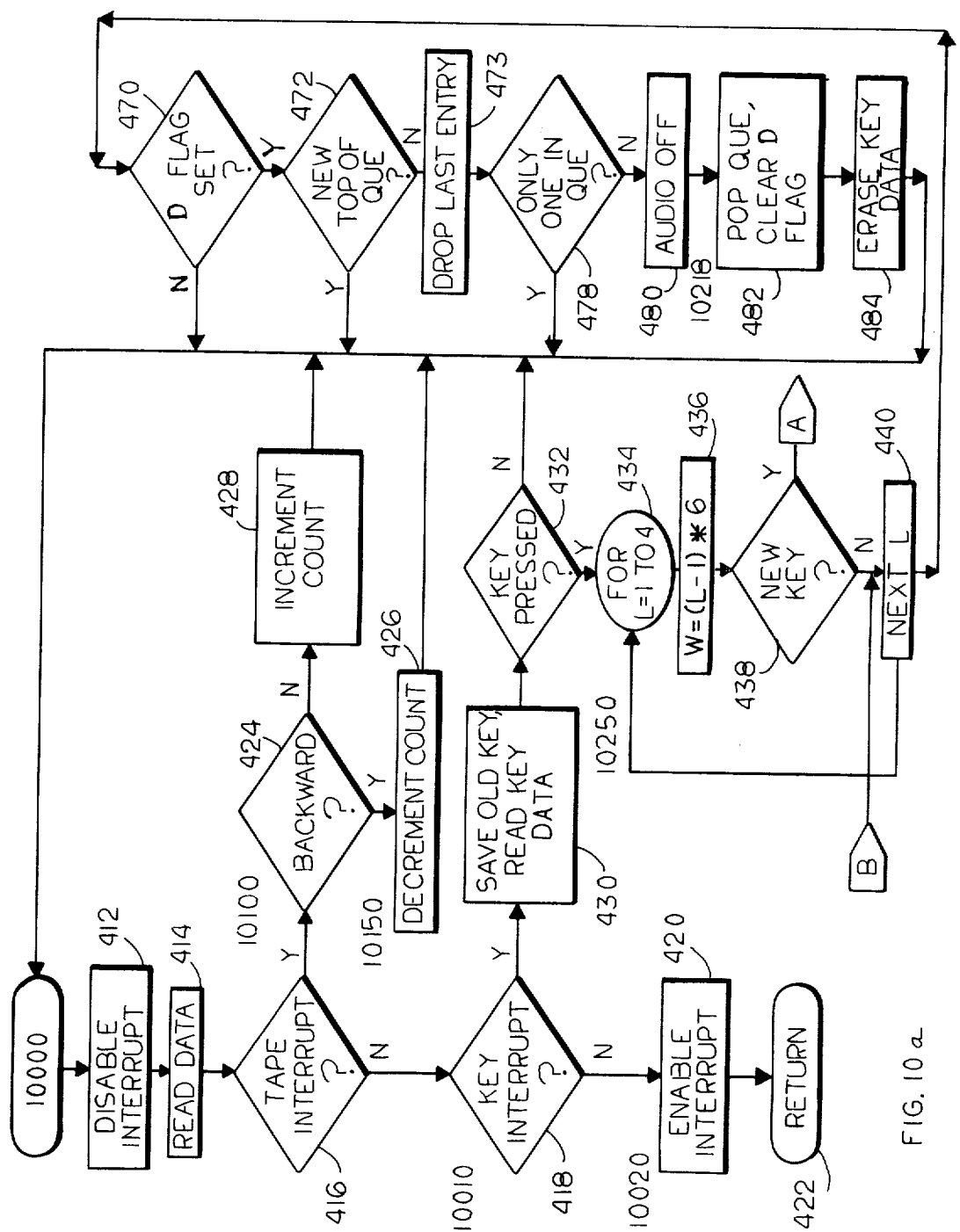
Figure 11A:
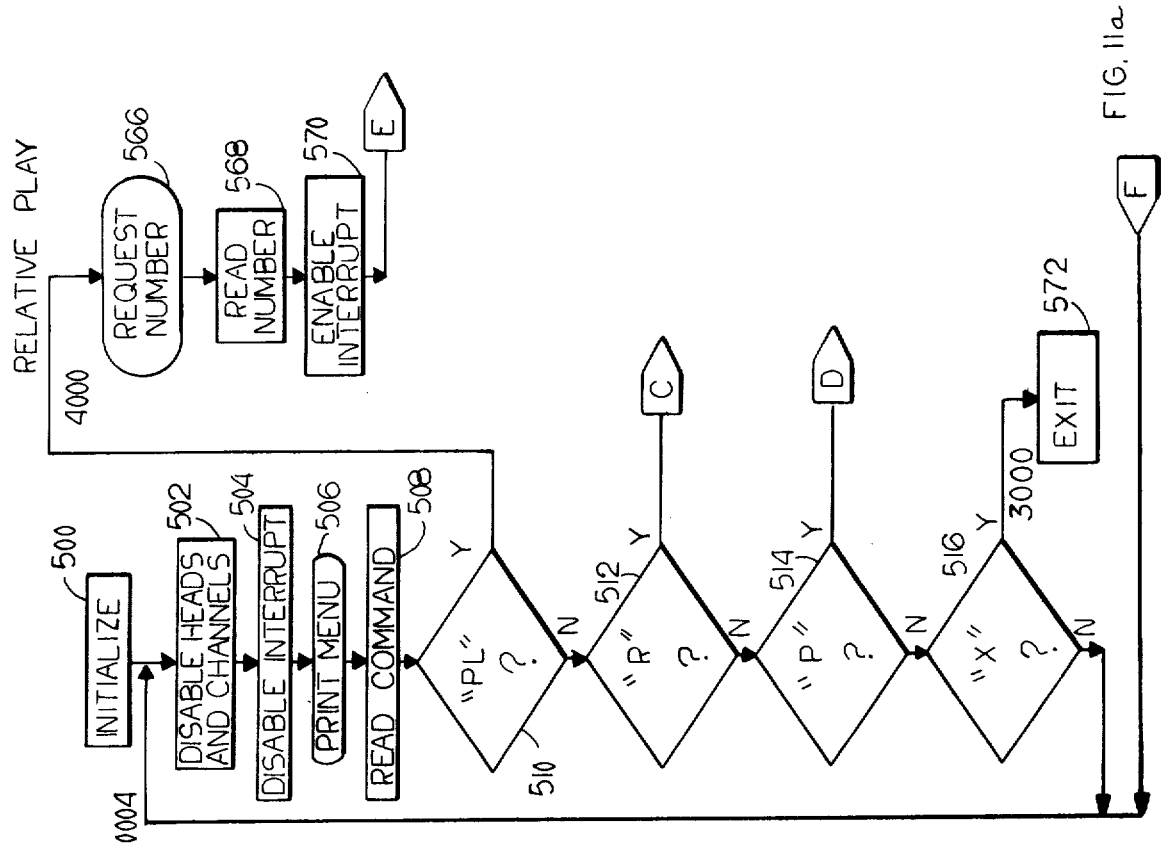
Figure 10B:
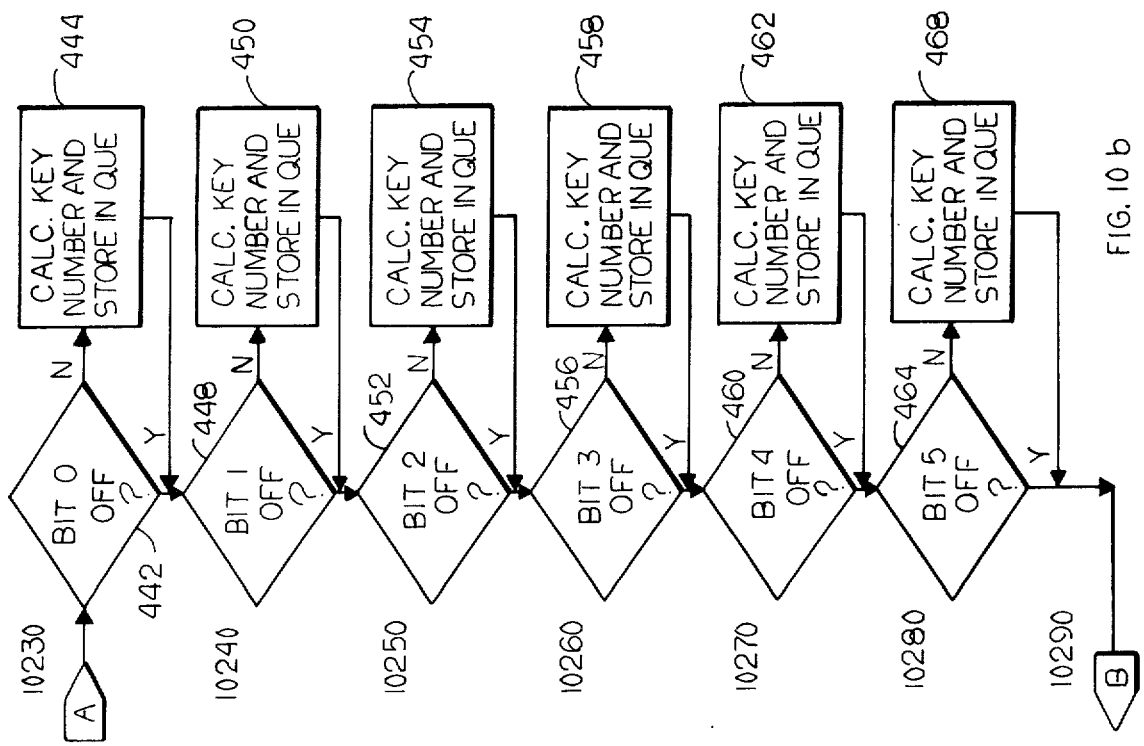
Figure 11B:
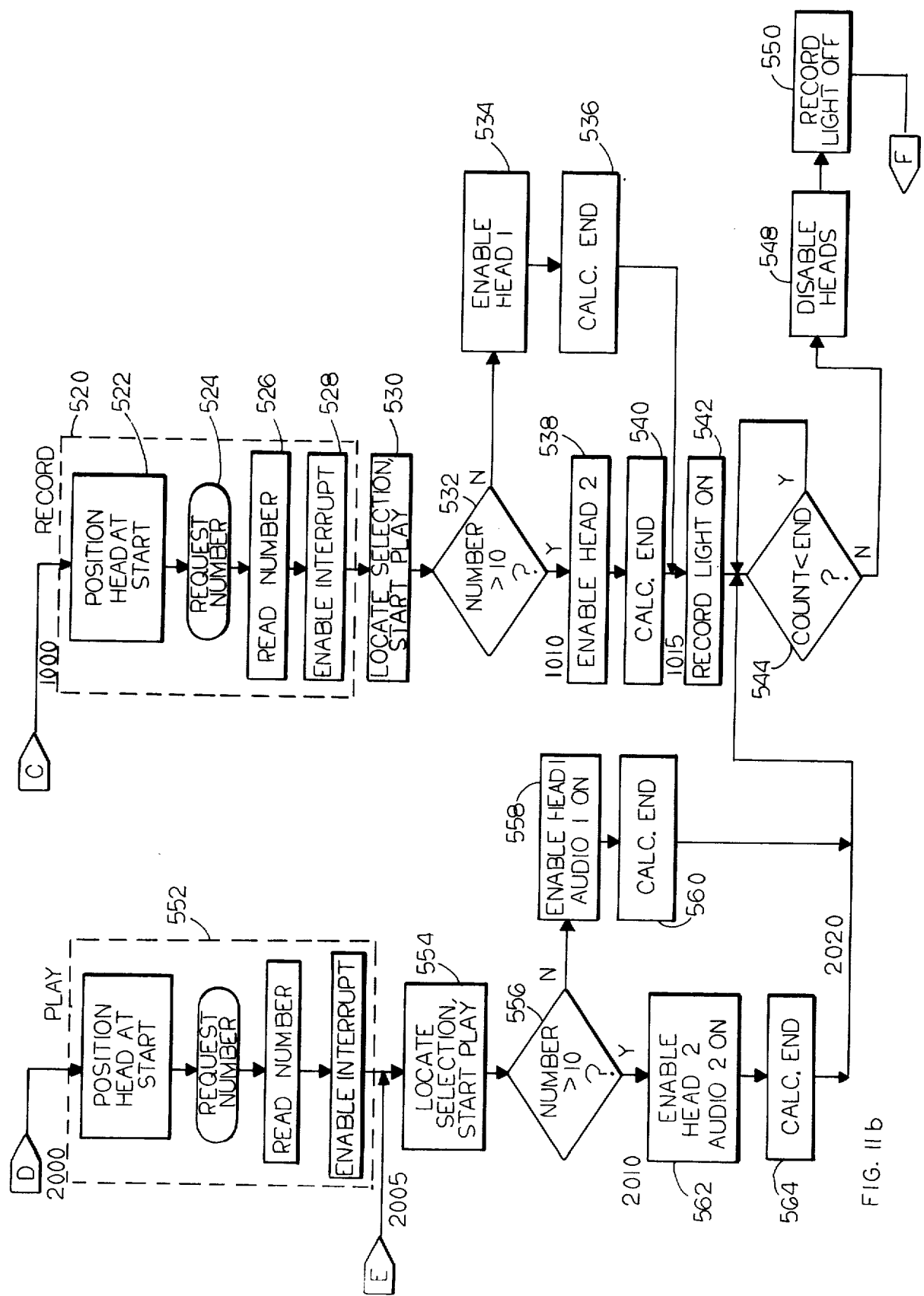

FIG. 10, consisting of FIGS. 10a and 10b, is a flow chart of the interrupt handling subroutine of the main program of FIG. 7; and FIG. 11, consisting of FIGS. 11a and 11b, is a flow chart of a recording program usable with the device of FIG. 1.

Referring to the drawings more particularly by reference numbers, number 10 in FIG. 1 identifies a record merchandising device constructed according to the present invention. The merchandising device 10 includes an upright cabinet portion 12 having a plurality of display racks 14 to display records and record albums offered for sale in conjunction with the device 10. The device 10 as shown in FIG. 1 includes the upright cabinet 12 having twenty display racks 14 arranged in five rows and four columns. The number of display racks could be increased or decreased and the electronics and software portion of the invention could be changed to accomodate the increase or decrease.

A plurality of selection switches 16 are provided, one switch shown located in a corner of each display rack 14, and an indicator light 18 is associated with each selection switch 16. The selection switches 16 can be activated by a customer who wishes to hear played a portion of a particular displayed record album before he purchases it. The selection indicator lights 18 indicate the selection made and are controlled by the electronics of the device 10 as will be explained. The record merchandising device 10 has an overhang portion 20 in which are located a lighting means 22 such as incandescent lights or flourescent lamps for lighting the display racks 14. The overhang 20 can also include one or more recording speakers 24 over which a portion of the record album selected by the selection switches 16 is played by the electronics of the invention as will be explained. The lower or rear portion of the record merchandising device 10 includes an electronics storage portion designated generally by number 26 in which the electronics of the invention are located.

Figure 2:
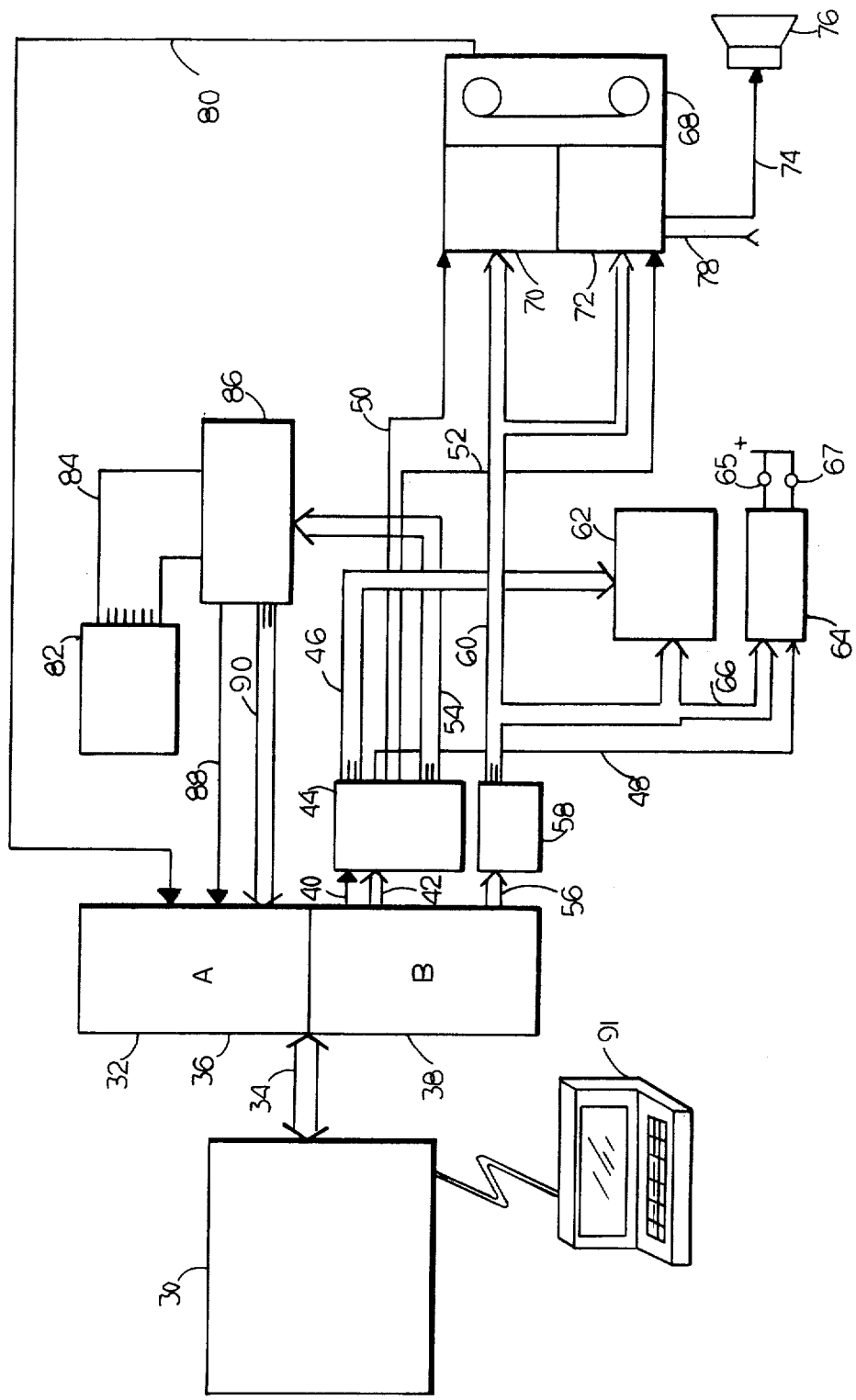
FIG. 2 is a schemaic diagram of the electronic control means of the device of FIG. 1.

FIG. 2 is a block diagram of the electronics of the present invention including a microprocessor 30 for controlling the electronics. A preferred microprocessor is the Motorola 6802 microprocessor which is compatable with the software and electronics disclosed herein. Other microprocessors, electronics and software constructed in accordance with the present invention may be used. The microprocessor 30 is connected to a peripheral interface adaptor (PIA) 32 by an I/O data bus 34 which passes data back and forth between the microprocessor 30 and the PIA 32. The preferred PIA 32 is a peripheral interface adaptor MC6820 marketed by the Motorola Company, and includes an input channel 36 labeled channel A and an output channel 38 labeled channel B.

The output section 38 of the PIA 32 will be discussed first and has a peripheral control line 40 programmed to operate as an output, and output data buses 56 and 42 for transmitting eight output data bits (B0–B7) with four data bits (B0–B3) transmitted over data bus 56 and four data bits (B4–B7) transmitted over data bus 42. The peripheral control line 40 and the data bus 42 are connected between channel B of the PIA 32 and an address decoder circuit chip 44. The data bus 56 is connected between channel B and a data buffer circuit chip 58. The address decoder circuit chip 44 is a 1-in-16 low output decoder TTL integrated circuit chip available from National Semiconductor Inc. and having the designation DM74154, which decodes the value of the data bits at its input and places a low at one of its sixteen outputs which cooresponds to the value at its input. The value of the data bits B4–B7 present on the data bus 42 may be any number from 0 through 15. However, in the present invention, the value of data bits B4–B7 is varied from "0–11" and thus only 12 outputs of address decoder circuit chip 44 are connected to data buses 46, 48, 50, 52 and 54. The data buffer circuit chip 58 connected to the data bus 56 accepts data bits B0–B3 output by channel B of the PIA 32 over data bus 56, and places them on data bus 60 referred to herein as data bits BD0–BD3.

The output lines of address decoder chip 44 are used to address the various control circuits of the electronics and are referred to by their hexadecimal values as select address control bits 0X–BX. The select address control bits 0X–4X are carried by the data bus 46 from the address decoder chip 44 to a selection indicator control circuit 62, the select address control bit 5X is carried by the data line 48 to a search/record indicator control circuit 64, the select address control bit 6X is carried by the data line 50 to a tape control circuit 70 controlling a two channel tape unit 68, the select address control bit 7X is carried by the data line 52 to an audio control circuit 72 controlling the input and output of audio signals of the tape unit 68, and the select address control bits 8X–BX are connected by the data bus 54 to a switch recognition control circuit 86. The first four channel B output bits (B0–B3) are buffered by buffer circuit chip 58 for transmission over data bus 60 as data bits BD0–BD3 to the selection indicator control circuit 62, the tape control circuit 70 of the tape unit 68, and the audio control circuit 72 of the tape unit 68. Two data bits (BD0–BD1) are transmitted by data bus 66 from data bus 60 to the search/record indicator control circuit 64.

The peripheral control line 40 is connected to the reset input of the address decoder circuit chip 44 and may be addressed by the microprocessor 30 to reset all of the control circuits 62, 64, 70 and 86 of the electronics at one time. When a two digit number is output by the microprocessor 30 to the B channel 38 of the PIA 32, the first or high order digit which is carried by data bits B4–B7, is transmitted over the data bus 42 to the address decoder circuit chip 44, and the second or low order digit which is carried by data bits B0–B3, is transmitted by data bus 56 to the data buffer chip 58. If the high order digit of data bits B4–B7 has a value of "0–4", the selection indicator control circuit 62 is addressed. A high order digit having a value of "5" addresses the search/record indicator control circuit 64, a high order digit value of "6" addresses the tape control circuit 70, a high order digit value of "7" addresses the audio control circuit 72, and high order digit values of "8–B" address the switch recognition control circuit 86. The value of the high order digit of data bits B4–B7 varies from "0–11", and, as previously explained, its corresponding select address control bits 0X–BX are activated by the address decoder circuit chip 44.

After the proper control circuit is addressed by the output of address decoder circuit chip 44, the data bits BD0–BD3 of data bus 60 indicates the control function to be performed by the circuit addressed. If the selection indicator control circuit 62 is addressed by the high order digit carried by data bits B4–B7, the low order digit of data bits BD0–BD3 is used by the control circuit 62 to locate the exact indicator 18 to be turned on. As will be explained in conjunction with FIG. 4, a high order digit equal to zero addresses the first row of indicators 18, a high order digit equal to "1" addresses the second row, a high order digit equal to "2" addresses the third row, a high order digit of "3" addresses the fourth row, and a high order digit of "4" addresses the fifth row. If data bit BD0 of data bus 60 is turned on, the first column of the row is indicated, data bit BD1 indicates the second column, BD2 indicates the third column and BD3 indicates the fourth column. Thus, the combination of the high order digit of data bits B4–B7 and the low order digit of data bits B0–B3 (BD0–BD3) is used to select any one of the twenty selection indicators 18 of FIG. 1.

An output value of "51" carried by data bits B0–B7 addresses the search/record indicator control circuit and turns on the search indicator 65, and a value of "52" turns on the record indicator 67. A value of "61" causes the tape control circuit 70 to place the tape unit 68 in fast rewind, a value of "62" places the tape unit 68 in fast forward, a value of "64" stops the tape unit 68, and a value of "68" places the tape unit 68 in play. A value of "71" carried by data bits B0–B7 instructs the audio control circuit to turn off head 1 of the tape unit 68, a value of "72" instructs the audio control circuit to turn off head 2 of the tape unit, a value of "73" instructs the audio control circuit to turn off both heads 1 and 2, a value of "74" instructs the audio control circuit to turn on the audio output of channel 1 and turn on heads 1 and 2 so that channel 1 may be played back, a value of "76" turns on the audio output of channel 1 and turns off head 2 to also play channel 1, a value of "78" turns on the audio output of channel 2 and turns on heads 1 and 2 to play back channel 2, and a value of "79" turns on the audio output of channel 2 and turns off the head 1 to also play back channel 2. If the high order digit of data bits B3-B7 has the hexadecimal value of "8 — B", the switch recognition control circuit 86 is addressed as will be further described in conjunction with FIG. 3.

The tape unit 68 has a tape counter which produces output pulses responsive to movement of the take-up tape reel in the tape unit 68 in either the forward or reverse directions. The output pulses or tape position pulses of the tape unit 68 are carried over a tape count interrupt line 80 to one of the inputs of channel A of the PIA 32. The plurality of selection switches 16 of FIG. 1 are included in selection switch circuit 82 which is connected to the switch recognition control circuit 86 by a data bus 84. The switch recognition control circuit 86 has a key interrupt line 88 connected to an input of channel A of the PIA 32 for transmitting a signal to the PIA 32 each time a selection switch in circuit 82 is activated.

The switch recognition control circuit 86 also has data bus 90 for transmitting data bits A0–A5 from the switch recognition control circuit 86 to channel A of the PIA 32. As will be explained, the selection switch circuit 82 includes the twenty selection switches 16 of FIG. 1 arranged in three groups of six and one group of two switches. Each group of selection switches is addressed by one of the select address control bits 8X–BX in data bus 54. To read the status of the selection switches in circuit 82, the select address control bits 8X–BX are polled sequentially with each select address control bit addressing a separate group of switches in the switch circuit 82. As each group is polled, data bits A0–A5 are turned on responsive to the status of the selection switches in the group being polled to indicate to the microprocessor 30 which of the switches 16 have been activated by a customer.

An input/output terminal 91 may be connected to the microprocessor 30 for printing or otherwise displaying messages from the microprocessor 30 and for inputting data such as from the keyboard of the terminal 91 to the microprocessor 30. The use of the terminal 91 will be further explained in combination with the record software routine in conjunction with FIG. 11.

Turning now to FIG. 3, the twenty selection switches 16 shown in FIG. 1 are shown divided into four groups, three groups having six switches and one group having two switches. It will be understood that only one group of switches and its associated electronics is shown in FIG. 3 and that the other groups of switches will be similarly connected. Switches 92–97 represent the first six selector switches each having one side grounded and the other side connected to data lines 100–105 respectively in the data bus 84. The data lines 100–105 are connected to the inverting inputs of a tri-state buffer 106 which may be a DM8097 or a DM8098 type integrated circuit chip. The inputs to the buffer 106 are connected to one side of resistors 111–116 respectively, and the other end of each resistor 111–116 is connected to a positive voltage. The switches 92–97 are in the normally open condition such that the voltage which appears at the inputs of the buffer 106 is normally in the high condition. When one of the switches 92–97 is activated, it's corresponding input line is grounded causing the corresponding input terminal to the buffer 106 to which the switch is connected to go to the low condition. Each of the data lines 100–105 is also connected to one of the inputs of an eight input OR gate 107. There are three of the OR gates 107, 108 and 109 with one of their input connected to one of the selection switches 16 similar to the connection of switches 92–97 to the OR gate 107. Each of the outputs of the OR gates 107–109 is connected to the input of a NOR gate 110 whose output is connected to the key interrupt data input line 88. It can thus be seen that when one of the switches 92–97 is activated, its corresponding data line goes low causing a low at the corresponding input terminal of the buffer 106, a high at the output of the OR gate 107, and a low at the NOR gate 110 which is transmitted over the key interrupt line 88 to channel A of PIA 32 as a key interrupt signal.

A key interrupt signal causes the microprocessor program to stop what it is doing and to begin polling the switch recognition control circuit 86 to determine which switch was activated. The microprocessor program does this by placing the number "80" on data bits B0–B7 at the outputs of channel B of PIA 32. In response to the high order digit "8" transmitted over data bus 42, the address decoder circuit chip 44 places a low on a data line 117 in data bus 54 corresponding to the address select control bit 8X. The data line 117 corresponding to the select address control bit 8X, is connected to the disable input and the store input of the latch circuit 106 such that when data bit 8X changes to a low condition, the input signals from switches 92–97 are latched and the tri-state outputs of the buffer 106 are enabled transmitting the switch status data over data lines 118–123 of data bus 90 to the input of channel A of the PIA 32.

After the microprocessor program has read the condition of switches 92–97 connected to the buffer 106, an output number of "90" is transmitted by channel B of the PIA 32. In response to the high order digit "9" on the data bus 42, the address decoder circuit chip 44 places a high on selector address data bit 8X, and a low on select address data bit 9X. Select address data bit 9X polls a second latch circuit in the switch recognition control circuit 86 to read the status of another set of six selection switches 16 over data bus 90 to channel A of the PIA 32 as described in connection with tristate buffer 106. When the data bit 8X goes from a low to a high the tri-state output of the latch 106 is disabled and the internal registers of the latch 106 follow the inputs thereto. The same sequence is followed for select address bits 9X, AX and BX to sequentially read the status of all twenty of the switches 16 shown in FIG. 1.

The microprocessor program also controls the turning on and off of the selection indicators lights 18 by the selection indicator control circuit 62 connected to data buses 46 and 60. The selection indicator control circuit 62 has four latches similar to latch 124 shown in FIG. 4. The latch 124 may be a TTL integrated circuit chip available from National Semiconductor Inc. and designated as a 7475 chip, and is connected to data lines 125–128 carrying data bits BD0–BD3 of the data bus 60. The outputs of the latch 124 are connected to one side of resistors 130–133 respectively, with the other end of resistors 130-133 connected to the bases of transistors 134-137 respectively. The emitters of the transistors 134-137 are grounded and the collectors of each transistor are connected to a positive voltage through incandescent lights 138-141 respectively. The select address control bit OX is carried on a data line 142 whose output is connected to the enable and store inputs to the latch 124. When the select address data bit OX on the data line 142 is a low, the low is inverted to a high by inverter 143 enabling the latch 124 such that the output of the latch 124 follows the input of data bits BD0-BD3 transmitted over data lines 125-128 respectively. If one or more of the data bits BD0-BD3 is a high, the respective 134-137 are turned on thereby turning on the respective indicator lights 138-141. The condition of data bits BD0-BD3 are latched in the latch circuit 124 until the next time that latch circuit is addressed by the address decoder 44. Similar latch circuits are connected to select address control bits 1X-4X for addressing and turning on the remaining indicator lights 18. A similar latch circuit is controlled by the select address data bit 5X carried on the data line 48, and the data bits BD0 and BD1 carried on the data bus 66 are used for controlling search/record indicators in the control circuit 64.

The 6X select address control bit carried on the data line 50 shown in FIG. 5, is connected to the input of an inverter 144 in the tape control circuit 70. The output of the inverter 144 is connected to the enable and store inputs of a latch 146 which may be a TTL 7475 integrated circuit chip previously described. The inputs of the latch 146 are connected to data lines carrying data bits BD0-BD3 in data bus 60, and the outputs of latch 146 are attached to the inputs of inverters 148-151 whose outputs are connected to the control circuit 152 of the tape unit 68. The output of the inverter 148 is connected to the fast rewind control of circuit 152, the output of the inverter 149 is connected to the fast forward control, the output of the inverter 150 is connected to the stop control, and the output of the inverter 151 is connected to the play control. When the latch circuit 146 is addressed by the address decoder circuit chip 44, the latch circuit 146 is enabled and the tape unit 68 is controlled in accordance to which of the data bits BD0-BD3 in the data bus 60 has been turned on as set forth earlier.

Figure 6:
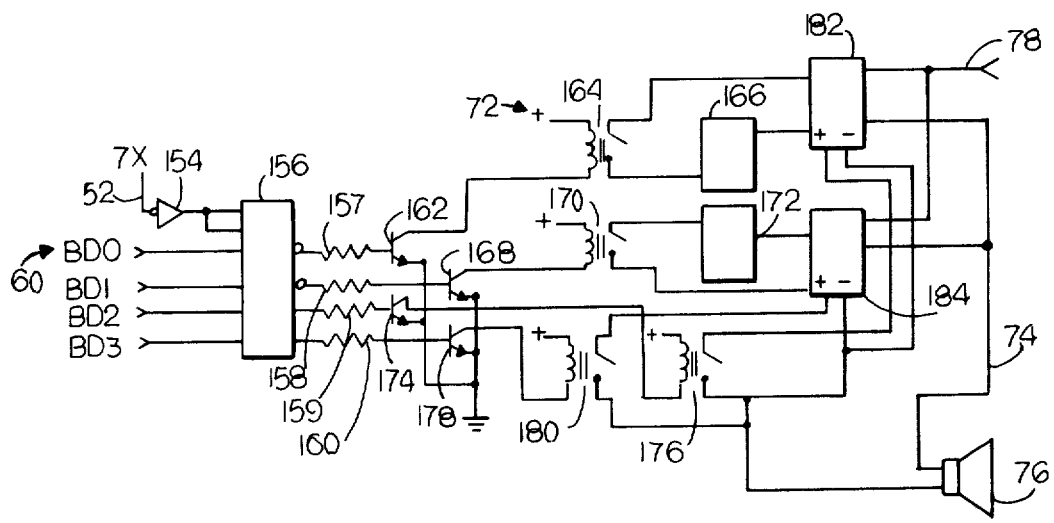
FIG. 6 is a schematic diagram of audio control circuit of the control means of FIG. 2.

The 7X select address control bit of the data bus 52 is connected to an inverter 154 in the audio control circuit 72 as shown in FIG. 6. The output side of the inverter 154 is connected to the enable and the store inputs of a latch 156, which latch may be a TTL 7475 integrated circuit chip as previously described. The other inputs to the latch 156 are connected to the data lines of the bus 60 that carry the data bits BD0-BD3. The inverting outputs of the latch 156 corresponding to data bits BD0 and BD1 are connected to one side of resistors 157 and 158, and the non-inverting outputs of the latch 156 corresponding to data bits BD2 and BD3 are connected to one side of resistors 159 and 160, respectively. The other side of the resistor 157 is connected to the base of a transistor 162 which acts as a switch to energize a relay 164 which, when energized, turns on head 166 for channel 1 of the type unit 68. The other side of the resistor 158 is connected to the base of transistor switch 168 which energizes a relay 170 for controlling another head 172 for channel 2 of the tape unit 68. Since the outputs of the latch 156 for data bits BD0 and BD1 are inverting outputs, the transistor switches 162 and 168 will activate the relays 164 and 170 turning on the heads 166 and 172 when the data bits BD0 and BD1 respectively are low or turned off in positive logic. The other side of the resistor 159 is connected to the base of transistor switch 174 which controls a relay 176, and the other side of the resistor 160 is connected to the base of transistor switch 178 which controls a relay 180. The relay 176 controls an output audio amplifier 182 for channel 1 of the tape unit 68, and the relay 180 controls an audio output amplifier 184 for channel 2 of the tape unit 68. The audio input 78 of the tape unit 68 is connected to the inputs of both audio amplifiers 182 and 184, and the audio output 74 of the tape unit 68 is connected to the outputs of the audio amplifiers 182 and 184 and to loudspeaker 76 which may correspond to the speaker 24 of FIG. 1.

When the head 166 of channel 1 of the tape unit 68 is energized, the audio signals on input 78 are recorded on track 1 of the tape in the tape unit 68. When the head 72 of channel 2 of the tape unit 68 is energized, the audio signals on input 78 are recorded on track 2 of the tape. When head 166 and audio amplifier 182 are both energized, the audio signals recorded on track 1 of the tape in tape unit 68 are played back through the audio output lead 74 to the loud speaker 76. When the head 172 and the audio amplifier 184 for channel 2 of the tape unit 68 are energized, the audio signals recorded on track 2 of the tape are played back over the speaker 76.

FIGS. 7-10 are flow charts of the microprocessor programs listed in Table 1 herein, and FIG. 11 is a flow chart of the microprocessor program listed in Table 2 herein. The programs of Tables 1 and 2 are written in the A/Basic program language as set forth in the A/Basic Compiler, Version 2.0 F reference manual available from Microware Systems Corporation. The "PEEK" command, not otherwise covered in the reference manual, is used for reading input values. The first column of Tables 1 and 2 is machine code address location assigned by the A/Basic compiler corresponding to the source code statements shown in column 3 of the tables. The second column of Tables 1 and 2 is the line or statement number for the statements in the source code column as numbered by the programmer. If the statement number is equal to or greater than 10,000, the statement number appears in the line number column with a ":" in the thousands place. For example, in Table 1 at machine code address location 3A82, the line number 10,000 appears as ":000".

The main playback program for the device 10 is programmed in accordance with the flow chart of FIG. 7 and is listed in Table 1 at machine code address locations 1000-335D. At block 200 corresponding to machine code address locations 3000-310D of Table 1, the variables used in the program are initialized. At block 202 which starts at statement number 0001 and corresponds to machine code address locations 3163-316C, pointers used by the program are initialized. At the machine code address location 3166 in Table 1, the program is instructed to go to the subroutine starting at statement number 10000 upon an interrupt condition. As explained in connection with the tape unit 68 and the switch recognition control circuit 86, this interrupt condition occurs when either a key interrupt is transmitted from NOR gate 110 over peripheral control line 88 or a tape interrupt is transmitted from the top control unit 68 over peripheral control line 80.

At block 204 corresponding to machine code address locations 316F-3190 of Table 1, the program initializes the PIA 32 such that peripheral control lines 80 and 88 are programmed as input lines and peripheral control line 40 is programmed as an output line. The For/Next loop at machine code address location 3190 sequentially addresses each of the control circuits 62, 64, 70 and 72 clearing the output of the latches in each of these control circuits as discussed in conjunction with FIGS. 3-6 to an initial condition turning off all of the indicators in circuits 62 and 64 and turning off the audio outputs of the audio control circuit 72.

At block 206 corresponding to machine code address locations 31C5-321C of Table 1, the program positions the tape in the tape unit 68 such that the heads 166 and 172 are at the start of the tape. At block 206 corresponding to machine code address location 31C5 of Table 1, the program calls the subroutine starting at line number 1000 issuing a play command to the tape unit 68. The program then calls the subroutine starting at line number 1620 causing a delay of one second during which the tape in the tape unit plays. After the tape unit has played for one second, the program at machine code address location 31CB calls the subroutine starting at line 1050 to issue a fast rewind command to the tape unit 68. At line number 0002, the program issues the PEEK ($8800) command which reads the channel A inputs received over data input bus line 90 clearing the data registers in channel A. Next, the program goes through a For/Next loop at machine code address location 31D6 and awaits an interrupt from either of the peripheral input control lines 80 or 88. After receiving an interrupt signal, the program issues the PEEK ($8801) command which reads the interrupt input from peripheral input control lines 80 and 88. A count interrupt received by the PEEK ($8801) command will have a value of "$40", while a key interrupt will have a value of "$80". The program will continue going back through the For/Next loop until the input on $8801 shows that a slowdown or stop of count interrupts has occured indicating that the tape has been completely rewound. At the machine code address location 3213 of Table 1, the program calls the subroutine starting at line number 1040 issuing a fast forward command to the tape unit 68.

At block 208 corresponding to the second source code command at machine code address location 321C, the program enables the interrupt function of the A/-Basic software such that either a tape interrupt or a count interrupt immediately calls the subroutine starting at line number 10000 as had previously been specified in block 202. It will be remembered that at this point the tape unit is in the fast forward condition. Tape count interrupts received in response to the tape moving in the tape unit 68 are counted by the subroutine starting at line number 10,000 as will be explained in conjunction with FIG. 10.

At block 210 corresponding to machine code address locations 3223-3290 and starting at line number 0004, the program starts the playing of the tape unit 68 by staying in a loop until the tape count exceeds the number "3600" indicating that the tape is at its beginning position. At line number 0005, the subroutine starting at line number 1000 is called issuing a play command to the tape unit 68. Logic checks of the variable H at machine code address locations 323B and 325F turn on the audio output of channel 1 of the tape unit 68 if the variable H has a value of "1" indicating the tape is being played for the first time, and turn on the audio output of channel 2 if the variable H has a value of "2" indicating the tape is being played the second time. Thus the program of Table 1 plays in sequence all of the selections recorded on channel 1 of the tape, and then rewinds the tape and plays all the selections recorded on channel 2 of the tape until one of the switches 16 is activated indicating that a customer has made a selection. The customer's selections, when made, are stored in a queue, abbreviated "que" in this specification and on the drawings which corresponds to an array labeled Q. The Q array is dimensioned to have 20 elements for storing the addresses of selections made by a customer so that a customer may select up to 20 recordings in any order desired.

As will be explained in connection with block 212-220, the program causes the indicator 18 for the selection at the top of the que and being played by the tape unit 68 to sequentially blink on and off in one second intervals. This blinking indicator calls the customer's attention to the record from which the selection presently being played has been taken. The program utilizes the one second blinking interval to monitor the status of the tape unit 68, and finds the next selection in the que when the end of the present selection has been reached, as will be explained in connections with FIG. 9.

In block 212 starting at line number 10 and corresponding to machine code address location 326B-3290, the program establishes the que control bit pattern for each of the selection indicators corresponding to the selection switches activated by a customer. In block 212, the program calls the subroutine starting at line number 1550 setting all of the elements in the working storage arrays labeled U and V to zero. The program then loops through a For/Next loop calling in each pass of the loop the subroutine starting at line number 1500 decoding the number stored in each of the 20 elements of the Q array. The decoding subroutine starting at line number 1550, and discussed hereinafter in connection with FIG. 8, establishes the bit patterns used by the selection indicator control circuit 62 to turn on individual indicator lights 18 corresponding to the selection switches 16 activated by a customer. As will be seen later, each key interruption causes a number representing the individual switch activated to be stored in the next available element of the Q array, which number is decoded by the decoding subroutine of FIG. 8 to the bit pattern of the corresponding individual indicator. The bit patterns for all the switch numbers stored in the Q array are stored in the U array, and the bit pattern for the number stored in the first element of the Q array is stored in the V array.

At block 214, the program turns on all of the selection indicators 18 corresponding to the bit patterns decoded in block 212 and stored in the U array by the source statement at machine code address location 32AA of Table 1 which calls the subroutine starting at line 1600. This subroutine commands the selection indicator control circuit 62 to turn on the selection indicators 18 corresponding to the bit patterns stored in the U array.

At block 216 corresponding to machine code address location 32AD of Table 1, the program calls the subroutine starting at line number 1300 of Table 1 to monitor the recorder and delay for the proper blink rate. As will be further discussed in connection with FIG. 9, this subroutine monitors the status of the tape unit 68 for one second, and, if the end of a selection is reached, locates the tape in tape unit 68 at the next selection stored in the Q array.

At block 218 corresponding to machine code address locations 32B0-335D of Table 1, the program turns off the indicator corresponding to the selection at the top of the que. The program does this by going through a For/Next loop which subtracts the control bit patterns stored in the V array from the control bit patterns stored in the U array. At machine code address location 32E7, the program issues a command to the selection indicator control circuit 62 to turn on all of the indicators 18 represented by the control bits in each element of the U array except for those control bits also in the same elements of the V array. The effect of this loop is to turn off the selection indicator 18 which corresponds to the number of the selection at the top of the que.

At block 220 corresponding to the second source statement at machine code address location 335D of Table 1, the program again calls the subroutine starting at line number 1300 monitoring the recorder and delaying the blink rate for another one second time period. After block 220, the program returns to statement number 0010 of block 212 to again establish the que control bit patterns and turn on all of the indicators 18 which indicate all selections made and stored in the que. The sequence described in connection with blocks 212-220 continuously blinks on and off in one second intervals, the indicator 18 corresponding to the selection being played by the device 10, and keeps on all of the indicators corresponding to other selections in the que. The indicator for the selection being played blinks on an off until the selection ends and the program goes to the next selection. As shown in FIG. 7, the blocks 216 and 220 have end of tape exits 217 and 221 which return the program to statement number 0001 which, when the end of the tape being played by the tape unit 68 is reached, returns the program to the top of the flow chart for restarting the program at line number 0001 as previously described.

Figure 8:
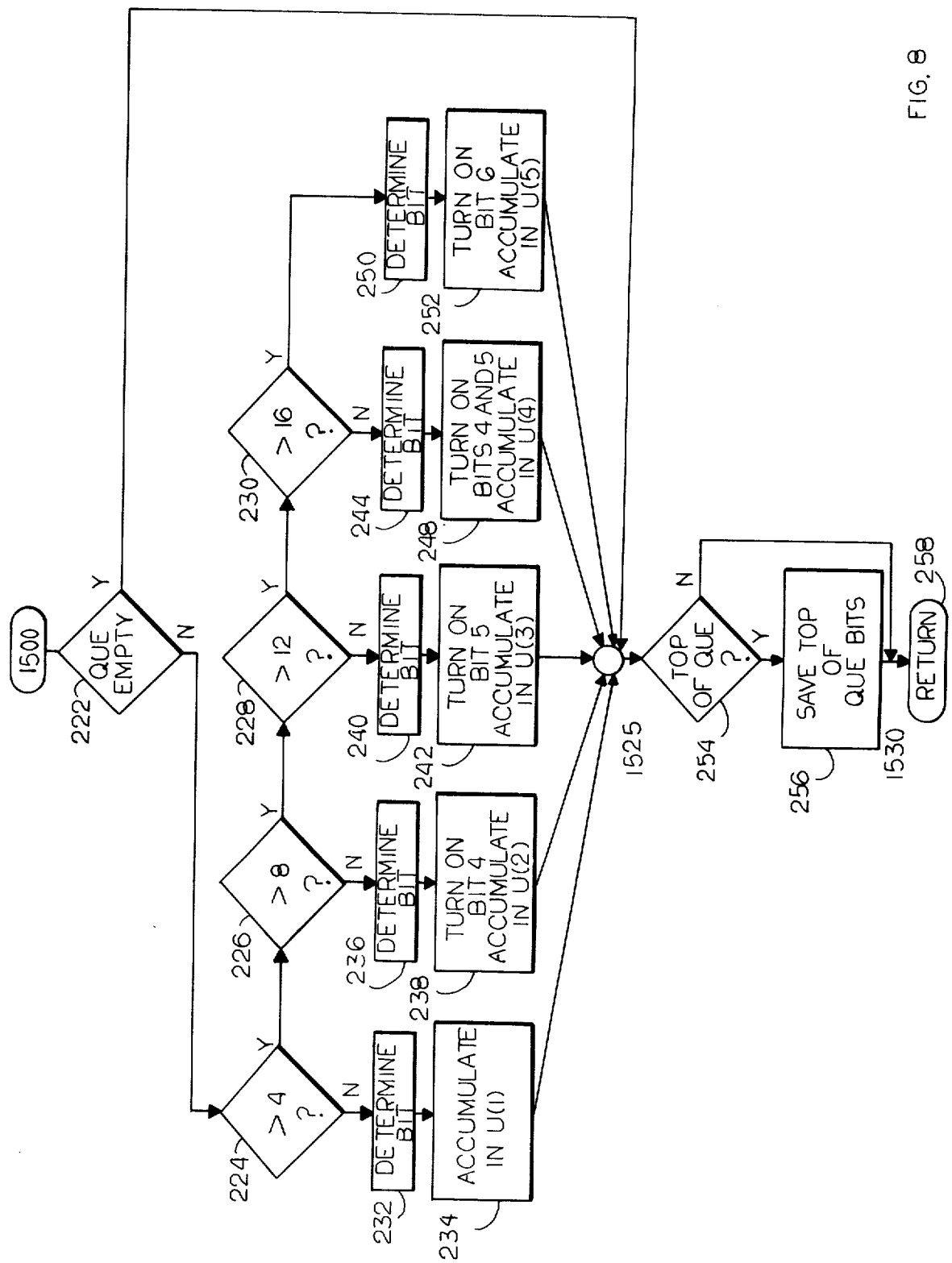
FIG. 8 is a flow chart of the subroutine for establishing the control bits used in the main program of FIG. 7.

FIG. 8 is a flow chart of the subroutine for establishing the control bits used by the indicator control circuit 62 for turning on the indicator 18 corresponding to a selection switch 16 which has been activated by a customer. This subroutine corresponds to machine code address locations 37D7-39AE of Table 1. The subroutine starts at line number 1500 of FIG. 8 at logic check 222 corresponding to machine code address location 37D7 for detecting if the que is empty. This is done by checking the switch number stored in the data variable X which contains the number of the selection switch in the element of the Q array presently being processed as determined by the For/Next loop starting at machine code address locations 326E of Table 1. At the end of this For/Next loop, all of the switch numbers in the Q array will be decoded and stored in the U array. If the element of the Q array being processed contains a zero, the program goes to statement number 1525 of Table 1 to be discussed later.

If there is a switch number in the element of the Q array being processed, the subroutine transfers to a series of IF statements in blocks 224, 226, 228 and 230 (FIG. 8) for transferring the subroutine to one of five branches of the subroutine depending upon the value of the switch number. If the switch number is between 1 and 4, the subroutine goes to block numbers 232 and 234; if the switch number is between 5 and 8, the subroutine goes to blocks 236 and 238; if the switch number is between 9 and 12, the subroutine goes to blocks 240 and 242; if the switch number is between 13 and 16, the subroutine goes to blocks 244 and 248; and if the switch number is greater than 16, the subroutine goes to blocks 250 and 252. Blocks 224, 232 and 234 correspond to the source statements at machine code address location 37E7 of Table 1, blocks 226, 236 and 238 correspond to the source statements at machine code address location 3827 of Table 1, blocks 228, 240 and 242 correspond to the source statements at machine code address location 3877 of Table 1, blocks 230, 244 and 248 correspond to the source statements at machine code address location 38C7 of Table 1, and blocks 250 and 252 correspond to the source statements at machine code address location 3917 of Table 1.

In blocks 232, 236, 240, 244 and 250 the proper bit is turned on to turn on the desired data bits BD0-BD3 in data bus 60 addressing the indicator desired when the selection indicator control is addressed by the subroutine starting at line number 1600 of Table 1 as explained in conjunction with FIG. 4. As explained, the value of variable X in block 232 varies from "1" to "4". If the value is "1", data bit BD0 is turned on; if the value is "2", data bit BD1 is turned on; if the value is "3", data bit BD2 is turned on; and if the value is "4", data bit BD3 is turned on. In block 236, the number "4" is subtracted from the value of X such that X again varies from "1" to "4". The same data bit scheme is then used as was used in block 232. Likewise, the number "8" is subtracted from the value of X in block 240, the number "12" is subtracted from the value of X in block 244, and the number "16" is subtracted from the value of X in block 250 so that in each of the blocks 232, 236, 240, 244 and 250 the value of X varies from "1" to "4". The subroutine starting at line number 1200 of Table 1 is called in each of the blocks 232, 236, 240, 244 and 250 to calculate the proper data bit to be turned on for the value of X.

In the first pass of the For/Next loop at machine code address location 326E, the value of the elements of the U array have been set to zero by the subroutine starting at line number 1550 of Table 1 which was called in the block 212. Bits 0, 1, 2 and 3 of the U array are transmitted by data bus 56 to the buffer 58 for buffering these data bits as BD0-BD3 to the data bus 60. Data bits 4, 5, 6 and 7 of the U array are transmitted by the data bus 42 to the address decoder circuit 44 for turning on one of the outputs 0X-4X of the address decoder 44 for addressing the proper latch circuit in the selection indicator control circuit 62 for turning on the indicator 18 desired. In block 234 of FIG. 8, the subroutine leaves data bits 4, 5, 6 and 7 of the first element in the U array turned off and accumulates the data bits 0-3 as determined by block 232 in each pass of the For/Next loop in the first element of the U array. In block 238 of FIG. 8, the subroutine turns on bit 4 of the second element of the U array and accumulates the data bits 0-3 as determined by block 236. In block 242 of FIG. 8, the subroutine turns on bit 5 of of the third element of the U array and accumulates the data bits 0-3 as determined by block 240. In block 248 of FIG. 8, the subroutine turns on data bits 4 and 5 of the fourth element of the U array and accumulates the data bits 0-3 as determined by block 244. In block 252 of FIG. 8, the subroutine turns on bit 6 of the fifth element of the U array and accumulates the data bits determined by block 250. As explained in connection with FIG. 4, each element in the U array addresses a different latch circuit in the selection indicator control circuit 62 and each of the bits 0-3 of the element addresses one of the four indicators controlled by that latch. For instance, the first element of the U array addresses latch 124 as shown in FIG. 4 and bit 0 of that element addresses indicator 138, bit 1 addresses indicator 139, bit 2 addresses indicator 140 and bit 3 addresses indicator 141. Each of the elements of the U array thus controls the turning on of four indicators of the total twenty indicators in the device 10.

At the end of each of the blocks 234, 238, 242, 248 and 252 the subroutine goes to statement number 1525 which is an IF statement 254 to determine if the switch number just decoded by the subroutine was stored in the first element of the que. If not, the subroutine returns to the main program at statement number 1530. If the switch number just decoded is the first element at the top of the que, the subroutine goes to block 256 and stores the bit patterns of the first element of the que in the V array for later use in block 218 as explained in connection with FIG. 7. The subroutine then returns to the main program at block 258 corresponding to statement number 1530 of Table 1.

Figure 9:
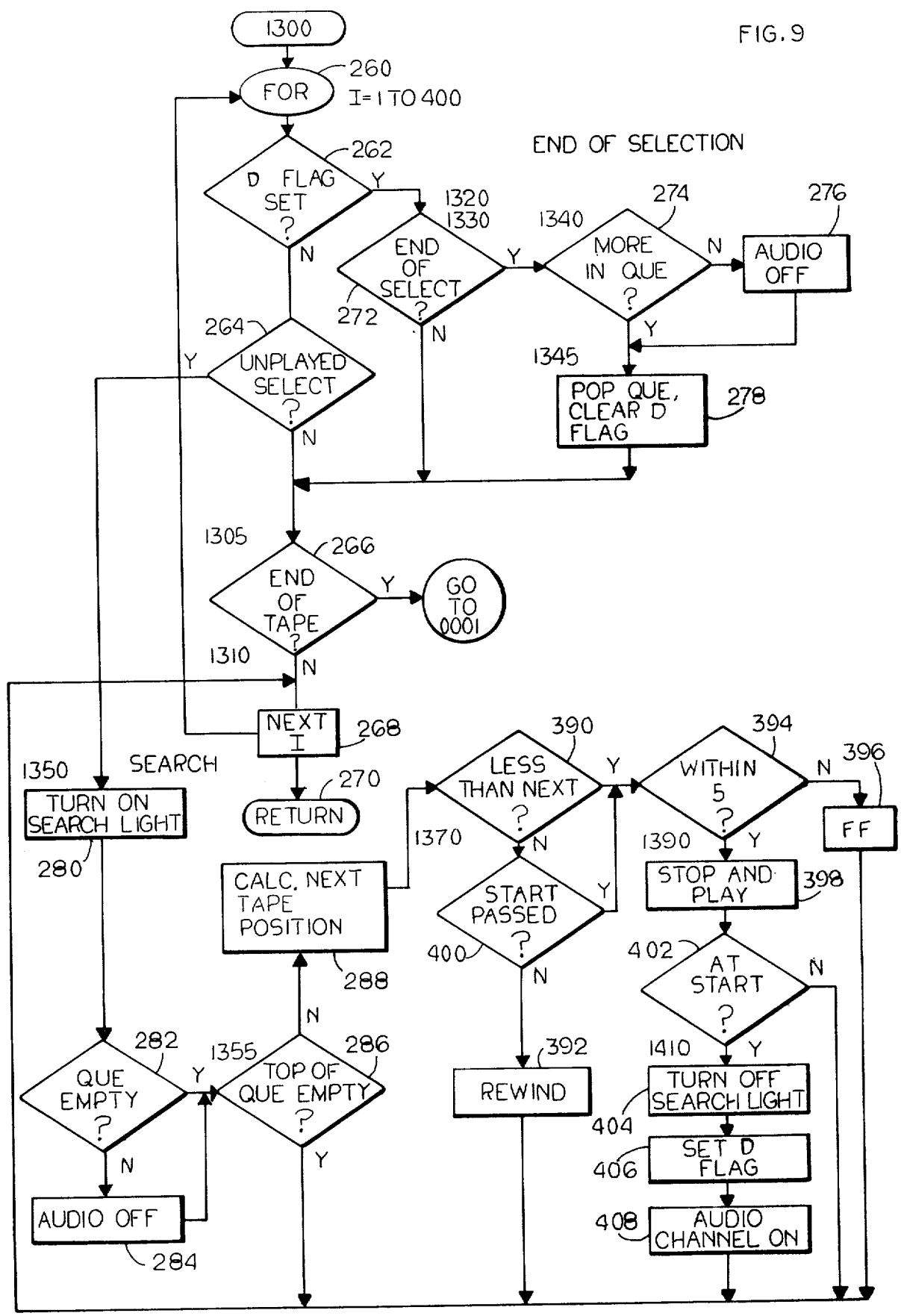
FIG. 9 is a flow chart of the monitor recorder and delay blink rate subroutine of the main program of FIG. 7.

FIG. 9 is a flow chart for the monitor recorder and delay blink rate subroutine corresponding to machine code address locations 34F4–37CE of Table 1, which subroutine is called in blocks 216 and 220 of the main program of FIG. 7. The monitor recorder subroutine starts at statement number 1300 and enters a For/Next loop at 260 starting at machine code address location 34F4 and ending at machine code address location 353D of Table 1. This For/Next loop executes 400 iterations of the loop to give a delay of about one second for the blink rates as explained in connection with the main program of FIG. 7. The subroutine has an IF statement 262 corresponding to machine code address location 3503 of Table 1 for checking to see if the tape unit 68 of the device 10 is still playing a selection. This is done by checking the value of a playing flag which is a variable labeled D. As will be explained later, variable D is set to zero when a new selection is moved to the top of the que, and is given the value of the switch number at the top of the que when a selection is being played. If the variable D is zero, the subroutine moves to IF statement 264 corresponding to the machine code address location 3513 of Table 1. Statement 264 checks the value at the top of the que to determine if there are any unplayed selections in the que. If the value of the first element of the array labeled Q is zero, there are no selections to be played and the subroutine goes to IF statement 266 at line number 1305 corresponding to machine code address location number 352B of Table 1. At IF statement 266, the subroutine checks the maximum value of the line count variable C to determine if the end of the tape unit is reached whereupon the program exits from the tape recorder monitoring subroutine of FIG. 9 and returns to statement number 0001 as explained in connection with FIG. 7. If the end of the tape in tape unit 68 has not been reached, the subroutine goes to statement 268 corresponding to machine code address location number 353D of Table 1 and increments the counter for the For/Next loop returning to the beginning of the loop at 260 until a total of 400 iterations have been completed. The subroutine then returns to the main program at return statement 270 which is the second source statement shown at machine code address location 353D of Table 1.

Returning to the IF statement 262, if the selection playing flag D has a value other than zero, a selection is playing and the subroutine goes to the logic check 272 to determine if the end of the selection playing has been reached. Logic check 272 corresponds to machine code address locations 3558–35BD. At the beginning of check 272, the subroutine sets the variable O equal to zero for use later in the program to determine if the tape is within five selections of the desired selection as will be explained. Block 272 then checks which track is being played. If track 1 is being played, the subroutine goes to line number 1320 of Table 1, and if track 2 is being played, the subroutine goes to line number 1330 of Table 1. At line number 1320 a check is made to see if the calculated end for a selection played on track 1 has been reached, and at line number 1330 a check is made to see if the calculated end for a selection played on track 2 has been reached. If the end of the selection being played has not been reached, the subroutine goes to line number 1305 and continues through the loop as previously described, allowing the selection to continue playing.

If the end of the selection has been reached, the subroutine goes to IF statement 274 corresponding to machine code address location 3603 of Table 1 to determine if there are any more selections waiting in the que. This is done by checking the variable labeled P which is a counter variable whose value indicates the number of selections in the que. Variable P is incremented when a selection is added to the que and is decremented when a selection is subtracted from the que. If there are no more selections waiting in the que, the subroutine goes to block 276 corresponding to machine code address location 3615 of Table 1 turning off the audio of both channels 1 and 2 by outputting the value "$70". The upper digit "7" goes to the address decoder 44 over the data bus 42 and turns on select address control bit 7X which addresses the audio control circuit 72 over the data line 52 as previously explained. The lower digit zero is transmitted over the data bus 56 to the buffer 58 for turning off all of the data bits BD0–BD3 transmitted over the data bus 60 to the audio control circuit 72. As previously explained, this energizes the heads 166 and 172 of the tape unit 68 and turns off the audio amplifiers 182 and 184 thereby turning off the audio output of the tape unit 68 to the loudspeader 76. After the audio output has been turned off, the subroutine goes to line number 1345 of Table 1.

If the logic check 274 of the subroutine determines that there are more selections in the que, the subroutine goes to line number 1345 of block 278 corresponding to the machine code address location 361B of Table 1. The subroutine pops the que which moves all of the values in the que up one element and drops off the value at the top of the que. The last element in the Q array is set to zero, the counter variable P is decremented by one, and the playing flag variable D is set to zero for indicating at the IF statement 262 that no selection is presently being played. The subroutine then goes to line number 1305 to continue through the loop as previously explained.

Returning to IF statement 264, if the program determines that there are unplayed selections remaining in the que, the subroutine goes to line number 1350 of block 280 corresponding to machine code address location 3694 of Table 1. In block 280, the subroutine outputs the variable "$51" to turn off the search light indicator as explained in connection with FIGS. 1 and 4. The subroutine then goes to the IF statement 282 corresponding to machine code address location 369A of Table 1 in which the value of the variable P is checked to determine if the que is empty. If the que is not empty, the subroutine goes to statement 284 corresponding to machine code address location 36AA turning off the audio output of channels 1 and 2 of the tape unit 68 as previously described. After statement 284, the subroutine goes to line number 1355 which is an IF statement 286 corresponding to machine code address 36B0 of Table 1 to determine if the top of the que is empty. If the IF statement 282 determines that the que is empty, the subroutine goes to statement number 1355.

The IF statements 282 and 286 are redundant to insure that if the que count variable P has been decremented but a switch number has not been stored in the que for some reason, the program will still operate correctly.

If the element at the top of the que as determined by the IF statement 286 is empty, the subroutine goes to statement number 1310 to continue through the loop as previously described. If the top of the que as determined by the IF statement 286 is not empty, the subroutine goes to block 288 corresponding to machine code address locations 36CA-370B to calculate the tape position of the next selection. If the next desired selection is stored on channel 1 of the tape, its starting position is calculated in the second source statement at machine code address location 36CA of Table 1. If the next selection is stored on channel 2 of the tape, the starting location is calculated at line number 1360 corresponding to machine code address location 370B of Table 1. The subroutine then goes to line number 1370 which is an IF statement 390 corresponding to machine code address location 372F to determine if the present tape position is less than the starting address of the desired selection. If the present tape position is not less than the starting position for the next selection it indicates that the tape is past the desired starting location and must be rewound. Thus, if the answer to IF statement 390 is no, the subroutine goes to IF statement 400 to be discussed later, and then to statement 392 corresponding to the third source statement at machine code address location 372F of Table 1 which calls the subroutine starting at line number 1050 of Table 1 issuing a fast rewind command to the tape control circuit 70 of the tape unit 68. After placing the tape unit 68 in the fast rewind mode, the subroutine goes to line number 1310 of Table 1 to continue the For/Next loop 260-268 as previously explained.

A present tape position less than the starting position of the next selection at IF statement 390 indicates that the next selection is forward of the present location. The subroutine then goes to the logic check 394 to determine if the present position is within an arbitrarily selected number of five position pulses of the start of the next selection desired. If the desired selection is not within the next five position pulses as determined by IF statement 394, the subroutine at block 396 calls the subroutine starting at line number 1040 of Table 1 issuing a fast forward command to the tape unit control circuit 70 as discussed in connection with FIGS. 2 and 5. After the tape unit 68 is in the fast forward mode, the subroutine goes to line number 1310 of Table 1 to continue through the For/Next loop 260-268 as previously described.

If the IF statement 394 determines that the next location is within the next five position pulses, the subroutine goes to block 398 starting at line number 1390 corresponding to machine code address location 377B where the subroutine sets the start flag variable O equal to "1" and then calls the subroutine starting at line number 1000 of Table 1 which first issues a stop command to the tape control unit 70 to stop the tape unit from either fast rewinding or going in the fast forward direction, and then issues a play command to the tape control unit 70 to start the tape unit 68 in the forward direction at playing speed. Even though a play command has been issued to the tape control circuit 70, the audio output controlled by the audio control circuit 72 has not been turned on at this point so that a selection is not actually being played by the tape unit 68 even though the tape unit is in the play mode and running and the tape is being advanced through the tape unit 68.

The variable O is set equal to 1 in the block 398 as described for later checking at IF statement 400 to determine if the subroutine has passed through block 398 in a previous iteration of the For/Next loop 260-268 wherein the desired selection was within five position pulses and the tape unit 68 was placed in the play mode. The IF statement 400 is thus a check to prevent the tape from rewinding if the desired selection has previously been within five position pulses on the tape for preventing a hunting condition wherein the tape unit 68 switches between going forward and rewinding several times looking for the exact beginning of the desired selection.

After completing block 398, the subroutine goes to IF statement 402 which checks to see if the tape count has a value at least equal to the value calculated to be the start of the desired selection. If not, the subroutine goes to statement number 1310 of Table 1 to continue through the For/Next loop 260-268 as previously described. If the tape count has a value that is at least equal to the value calculated to be the start of the next desired selection, the subroutine goes to block 404 corresponding to machine code address location 3795 and line number 1410 of Table 1. Block 404 of the subroutine issues a command to the search/record indicator control circuit 64 to turn off the search indicator. The subroutine then goes to block 406 corresponding to the first source statement at machine code address location 379B of Table 1 for setting the selection playing flag variable D to the value of the first element of the Q array for use by the IF statement 262 as previously described.

The subroutine then goes to block 408 corresponding to the remaining source statements at machine code address location number 379B through the statements at machine code address location number 37CE of Table 1. The instructions in block 408 turns on the audio output of either channel 1 or channel 2 of the tape in tape unit 68 depending upon where the desired selection is recorded as determined by the value of the selection number at the top of the que. The subroutine then goes to statement number 1310 to continue the For/Next loop 260-268 as previously described.

FIG. 10 is a flow chart for the interrupt handler subroutine corresponding to machine code address location 3A82-3EC0 of Table 1. The interrupt handler subroutine is called at any place in the program after the interrupt control has been enabled and is called whenever an interrupt signal is received over either of the peripheral control lines 80 or 88. After the interrupt handler subroutine is completed, control is transferred back to the point in the program where the interrupt handler routine was called. The interrupt handler first determines whether the interrupt was caused by a tape count interrupt from peripheral control line 80 or a key pressed interrupt from control line 88. If the interrupt handler routine was called by a count interrupt, the routine updates the tape counter variable C. If the routine was called by the key pressed interrupt, the switch recognition control circuit 86 is polled to determine which switch caused the key interrupt and the key number of the switch activated is calculated and stored in the next available element in the que. Before returning to the point where the interrupt handler routine was called, the routine checks to see if the last selection switch activated is for the selection presently being played. If they are the same, the routine stops the selection presently being played, and pops the que in order that a customer may reject a selection being played by activating the switch for the presently playing selection.

The interrupt handler subroutine starting at line number 10000 of Table 1 (:000) immediately disables the interrupt vector of the microprocessor 30 at 412 such that additional interrupts over lines 80 and 88 will not interfere with the execution of the routine. At 414, the subroutine reads the interrupt data into variable Z at $8801 and then reads the switch data of the data bus 90 at $8800 to clear the storage registers in channel A of the PIA 32. At IF statement 416 corresponding to machine code address location 3A98, the subroutine checks the variable Z and compares it to the value of "$40" to determine if a count interrupt has been transmitted by line 80. If the interrupt was not a count interrupt, the routine goes to IF statement 418 at line number 10010 corresponding to machine code address location 3AAC determining if the interrupt was caused by the activating of a selection switch causing a key pressed interrupt wherein the variable Z has a value of "$80". If the IF statement 418 determines that the interrupt vector was not caused by a key pressed interrupt, the subroutine goes to statement number 10020 at block 420 of FIG. 10 corresponding to machine code address location 3AC0 of Table 1 wherein the interrupt vector is again enabled. At statement 422, the subroutine returns to the point in the main program where the interrupt handler subroutine was called.

At the end of handling either a count interrupt or a key press interrupt, the subroutine returns to statement number 10000 to continue handling interrupts until all of the interrupts have been cleared. This assures that if any interrupts are entered in the PIA 32 during the time when the interrupt handler routine is being executed, these interrupts will not be lost but will continue to be handled until all interrupts have been cleared.

Returning to IF statement 416, if the interrupt vector is caused by a count interrupt, the subroutine goes to line number 10100 which is an IF statement 424 determining if the last control statement issued to the tape control 70 was a "$61" ordering the tape unit 68 to fast rewind. If the IF statement 424 response is yes, the subroutine goes to line number 10150 at block 426 corresponding to machine code address location 3AE1 of Table 1 and the tape counter variable C is decremented. The program then returns to statement number 10000. If the tape is not going backwards as determined by IF statement 424, the subroutine at block 428 increments the tape count variable C by one and the subroutine returns to statement number 10000 to continue looking for additional interrupts as previously discussed.

Returning to IF statement 418, if the interrupt vector is caused by a key interrupt, the program goes to line number 10200 of block 430 corresponding to machine code address locations 3AF0–3BAB. Block 430 first executes a For/Next loop at machine code address location 3AF0 storing in the R array for later use, the bit patterns for the last data switch read. At machine code address location number 3B3A–3B62 of Table 1, the subroutine goes through a For/Next loop which sequentially polls each of the six tri-state buffers in the switch recognition control circuit 86 as discussed in connection with FIG. 3. As each tri-state buffer is polled, its output is read by the second source statement at machine code address location 3B62 and stored in one of the elements of the S array. At machine code address location 3BAB only the first two bits of the fourth element of the S array are saved. Thus the status of the first six switches is stored in the first element of the S array, the status of the second six switches is stored in the second element, the status of the third six switches is stored in the third element and the status of the last two switches is stored in the fourth element. As discussed in connection with FIG. 3, if a switch has not been activated its corresponding bit will be zero, and if the switch has been activated by a customer its corresponding bit will be a one or turned on. The logic check at 432 corresponding to machine code address location 3BCF is a For/Next loop which checks each element of the S array to determine that a switch has been activated and a key pressed interrupt has been made. If this error check indicates that no key pressed interrupt has been made, the program returns to line number 10000 to continue processing interrupts as previously discussed. This For/Next loop is a redundant check to assure that data has been read after a key interrupt signal has been received over line 88.

If it is determined at 432 that a key interrupt has been made, the subroutine goes to statement number 10205 which is the beginning of a For/Next loop 434–440 corresponding to machine code address locations 3C13–3C85 of Table 1 having four iterations. For each pass through the For/Next loop 434–440, the value of a variable W is calculated at 436 by subtracting "1" from the index count of the For/Next loop and multiplying the result by "6". The value of W is thus "1" less than the number of the first switch of each switch group contained in each element of the S array. At IF statement 438 corresponding to machine code address location 3C38 of Table 1, the subroutine compares each element of the new key S array to the corresponding element of the old key R array to prevent the address of the same selection from being added to the que two times in a row, and to only read the first activation of a switch if it is activated several times in a row. The For/Next loop is incremented at 440 until the subroutine has run through the loop four times looking for a new switch activation, and the subroutine then goes on to the reject routine after the For/Next loop 434–440 is completed, as will be discussed later. It will be understood that this routine allows the activation of more than one switch at a time in either the earlier or the present passthroughhthe key pressed routine, and picks out only the new switch or switches activated in the present pass.

If a switch or switches in the element of the S array presently being checked in the For/Next loop 434–400 includes a switch or switches different from the switch or switches activated in the previous subroutine pass, the subroutine goes to the build address of the key pressed routine starting at line number 10230. The value "$01" is compared to the switch data by an AND statement, and the result is checked at IF statement 442 corresponding to the machine code address location 3DC4 of Table 1 to determine if the zero bit of the switch data is turned on. If bit zero of the key data is on, IF statement 442 sends the program to block 444 adding "1" to the value of W indicating that the first switch in the present group of six switches has been turned on, and this value is stored in the next available element of the Q array by calling the subroutine which starts at line number 1100 of Table 1. The interrupt handling subroutine then goes to line number 10240 of Table 1 to similarly check if bit 1 of the key data is turned off or on. If bit zero of the key data is determined to be turned off by IF statement 442, the subroutine also goes to line number 10240 of Table 1.

If bit 1 of the key data is on, IF statement 448 sends the program to block 450 adding "2" to the value of W and storing the switch number in the next available element of the Q array. Similarly, IF statement 452 checks bit 2 of the key data and block 454 adds "3" to the value of W and stores the result in the next available element of the Q array, IF statement 456 checks bit 3 of the key data and block 458 adds "4" to the value of W and stores the result in the next available element of the Q array, IF statement 460 checks bit 4 of the key data and block 462 adds "5" to the value of W and stores the result in the next available element of the Q array, and IF statement 464 checks bit 5 of the key data and block 468 adds "6" to the value of W and stores the result in the next available element of the Q array. This routine allows more than one switch address to be added to the Q array during a single pass through IF statements 442-464. After building the address of the key pressed as described, the subroutine returns to line number 10215 of the For/Next loop 434-440 to continue through the loop as previously described.

After the For/Next loop 434-440 has been completed, the program goes to the reject portion of the subroutine starting at the second source statement of line number 10215 corresponding to machine code address number 3C85. At IF statement 470, the subroutine checks the selection playing flag D to determine if a selection is presently playing. If the flag is equal to zero and a selection is not playing, the subroutine returns to statement number 10000 to continue processing interrupts as previously described. If a selection is playing, the subroutine goes to IF statement 472 checking to see if the last switch activated corresponds to the selection presently being played. If the selection being played is different from the last switch activated, the subroutine goes to statement number 10000 to continue processing interrupts as previously described. If the selection being played and the last switch activated are the same, block 473 corresponding to machine code address location 3CDD drops the address for the last switch activated from the que. At IF statement 478, the subroutine checks to see if this is the only selection presently in the que, and if it is, the subroutine returns to statement number 10000 to continue processing interrupts as previously described. Thus, if there is only one selection in the que and it is rejected, the selection continues playing until it is complete even though the selection has been rejected by the customer. If the IF statement 478 determines that there is more than one selection in the que, the subroutine turns off the audio output of the tape unit 68 at block 480 corresponding to machine code address location 3D06 by issuing a "$70" command to the audio control circuit 72 of the tape unit 68. At block 482 corresponding to the statements at machine code address location 3D0C, the subroutine pops the que, sets the last element of the que to zero and decrements the que counter by "2", eliminating the rejected selection at both the top and the end of the que. The selection playing flag D is also set to zero indicating to the program that no selection is presently being played. At block 484, corresponding to the statements at machine code address location 3D82, the subroutine enters a For/Next loop which sets all of the elements of the S array to zero.

FIG. 11 is a flow chart for a program to record on the tape of the tape unit 68 the selections to be played back by the playback program of FIGS. 7-10. At block 500 corresponding to machine code address location 3074-30E5 of Table 2, the program initializes the variables to be used. Line number 0004 corresponding to machine code address location 30EB of Table 2 is the beginning of block 502 wherein the command "$73" is issued disabling the heads 166 and 172 and turning off the audio output amplifiers 182 and 184 of tape unit 68. At 504 corresponding to machine code address location 30F1 of Table 2, the program disables the interrupt vector of the microprocessor 30 so that the program will not handle interrupt signals until the tape interrupt vector is later enabled as will be explained. At block 506 corresponding to machine code address locations 30F6-3197 of Table 2 the program prints a menu on the display device of the terminal 91 wherein the menu gives a list of commands which may be issued by a user. At block 508 corresponding to machine code address location 31B3 of Table 2, the program waits for a response indicating which command mode of the menu the user wishes the program to execute. At machine code address location 31D7 of Table 2, the program goes to line number 0100 of Table 2 which is an IF statement 510 corresponding to machine code address location 32AC of Table 2 determining if the user responded with a "PL" command indicating that the user has selected the "play from relative point" command of the menu. If the user has not selected the "PL" command, the program goes to IF statement 512 wherein the program checks to see if the user has selected the "R" command indicating that the user has responded with the "record" command.

If the "R" command has not been chosen, the program goes to IF statement 514 to determine if the user has selected the "P" command for the "play from zero point" command of the menu. At IF statement 516, the program checks to see if the user has selected the "X" command indicating the "exit" command of the menu has been requested. IF statements 512, 514 and 516 correspond to the source statements at the machine code address location 32D9 of Table 2. If none of these selections have been made, the program returns to line number 0004 which returns the program to the beginning of block 502 wherein the program disables the outputs of the tape unit 68, disables the interrupt of the program and once again prints the menu and awaits a command as previously described.

Returning to IF statement 512, if the user has selected the "R" command indicating a selection is to be recorded on tape, the program goes to line number 1000 corresponding to machine code address location 3360 of Table 2 wherein the program issues a print command without variables giving an indication over terminal 91 that the record sequence has started. The program calls the subroutine within block 520 starting at line number 0010 of Table 2 corresponding to machine code address location 31DA-32AB cf Table 2 for rewinding the tape on tape unit 68 to its starting position. At block 522 corresponding to machine code address locations 31DA-31E0 of Table 2, the program positions the recording heads 166 and 172 at the beginning of the tape. This is done by first calling the subroutine starting at line number 7000 of Table 2 for issuing a play command to the tape unit, then going to subroutine starting at line number 1620 of Table 2 for delaying one second allowing the tape unit 68 to run for one second, then at machine code address location 31E0 of Table 2 calling the subroutine at line number 7050 of Table 2 issuing a fast rewind command to the tape unit 68. While the tape is rewinding in response to the fast rewind command, the program at block 524 corresponding to machine code address location 31E3 of Table 2, prints on the terminal device 91 a request for an input selection number.

The number is input by the user as variable S at block 526 corresponding to the second source code statement at machine code address location 31E3 of Table 2. At line number 0012 corresponding to machine code address location 3217 of Table 2, the program reads channel A of the PIA 32 to clear the data registers in channel A. As discussed in connection with Block 206 of FIG. 7, the program at machine code address location 3221 of Table 2 goes into a For/Next loop waiting for an interrupt other than a count interrupt indicating that the tape has completely rewound. After the tape has been rewound, the program at machine code address location 3268 of Table 2, sets the count variable "C" to zero and calls the subroutine starting at line number 7040 of Table 2 issuing a fast forward command to the tape unit 68. At block 528 corresponding to machine code address location 3273 of Table 2, the subroutine addresses the PIA programming the inputs of channel A and turns on the count interrupt vector for counting the movement of tape through the tape unit 68 similar to that previously described in connection with Table 1.

At line number 0014 of Table 2 corresponding to machine code address location 327A of Table 2, the subroutine continuously checks the count of the tape indicated by variable C until a tape count of "3600" is reached. The subroutine at the second source statement of machine code address location 327A of Table 2, then reprograms the PIA 32 and at machine code address location 3294 of Table 2, changes the recorder from fast forward to the play mode by calling the subroutine which starts at line number 7000 of Table 2. The subroutine at line number 0016 of Table 2 corresponding to machine code address location 3297 of Table 2, then goes into a loop until the tape count variable C reaches the value of "3700" indicating that the heads 166 and 172 of the tape unit 68 are at the starting position of the tape. At machine code address location 32AB of Table 2, the subroutine returns to the point at which it was called in the main program.

At this point the tape has been rewound and is at the starting position, the tape unit 68 is in the play mode and the program has received the selection number of the selection to be recorded. At block 530 corresponding to machine code address location 3366 of Table 2, the program calls the subroutine starting at line number 8020 of Table 2 to locate the desired selection. This subroutine is similar to the routine discussed in connection with FIG. 9 of Table 1 wherein the search light is turned on at line number 8020, the beginning position of the desired selection is calculated depending upon whether the desired selection is to be recorded on channel 1 or channel 2 of the tape, the count variable C is compared to the calculated beginning position, and the tape is accordingly rewound or advanced until the beginning of the selection is found. As discussed in connection with FIG. 9, the subroutine of block 530 has a position check to determine if the tape is within five selections of the desired location. If the desired starting location is more than five selections away, the tape goes into the fast forward mode, and if the desired location is within the five selections, the tape unit goes into the play mode until the tape count is equal to or greater than the desired starting position. The O variable is used the same as that used in connection with FIG. 9 to provide an anti-hunt feature of the subroutine of block 530.

At IF statement 532 corresponding to machine code address location 3369 of Table 2, the program determines if the selection number requested is larger than 10. If the selection is smaller than 10, indicating that the selection is to be recorded on channel 1, the program goes to block 534 corresponding to the second source code statement at machine code address location 3369 of Table 2 issuing a command to turn off head 2 thereby enabling head 1. The variable N which is the tape count that will be present at the end of the selection recorded on channel 1, is calculated at block 536 and the program goes to line number 1015 of Table 2. If the IF statement at 532 determines that the selection is greater than 10 indicating that the selection is to be recorded on channel 2, the program goes to line number 1010 corresponding to machine code address location 33B4 of Table 2, issuing a command to turn off head 1 thereby enabling head 2 of the tape unit 68. The variable N which is the tape count that will be present at the end of the selection to be recorded on channel 2 is then calculated at block 540. At block 542 corresponding to line number 1015 and machine code address location 33EC of Table 2, the program issues a command to turn on the record indicator. The program then goes to the IF statement 544 at line number 1020 of Table 2 corresponding to machine code address location 33F2 of Table 2.

When the user sees the record light come on as discussed in connection with block 542, the user starts playing the selection to be recorded on a suitable record player connected to the input 78 thereby placing audio signals to be recorded on the audio input 78 of FIG. 6. The IF statement 544 keeps the program in a loop until the tape count is equal to or greater than the end count of variable N thereby recording on tape in the tape unit 68 the audio signals on audio input 78. When the tape count equals or exceeds the end count, the program goes to block 548 corresponding to machine code address location 340B of Table 2 wherein the software issues a command to turn off both of the recording heads 166 and 172 thereby terminating the recording of the audio signals. At block 550 corresponding to machine code address location 3411 of Table 2, the program issues a command turning off the record and search indicators, and at machine code address location 3417 of Table 2 the program goes to statement number 0004 restarting the main program as previously discussed.

Returning to IF statement 514, if the user selects the play from zero point command "P" the program goes to line number 2000 corresponding to machine code address location 344E. At line number 2000, the program calls the subroutine starting at line 10 (block 552) which is the same subroutine discussed in connection with block 520. After the program receives the selection number and positions the heads at the beginning of the tape in tape unit 68 during the execution of the block 552, the program, at line number 2005 of block 554 corresponding to machine code address location 3451 of Table 2, calls the subroutine beginning at line number 8020 of Table 2 locating the selection to be played and placing the tape unit 68 in the play mode as described in connection with the block 530. At IF statement 556 corresponding to the first source code statement at machine code address location 3454 of Table 2, the program determines if the selection number is larger than 10 to determine which of the tracks of the tape the selection to be played is recorded on. If the selection is equal to 10 or less, the program at block 558 enables head 1 of the tape unit 68 and turns on the audio output of channel 1 thereby playing the selection on channel 1 of the tape over the loudspeaker 76 shown in of FIG. 6. At block 560, the program calculates the end count for the end of the selection recorded on track 1 and returns to statement number 2020 corresponding to machine code address location 34D7 of Table 2. If the selection number is greater than 10, the program goes to line number 2010 of block 562 corresponding to machine code address location 349F of Table 2 issuing a command enabling head 2 and turning on audio amplifier 2 to play back channel 2 of the tape over the loudspeaker 76. The program then calculates at block 564 the end count for the end of the selection recorded on track 2 and goes to statement number 2020 which transfers the program to statement number 1020 for entering in the loop of IF statement 544 as previously discussed.

If the play from a relative point command "PL" is selected the program goes from IF statement 510 to line number 4000 of block 566 corresponding to machine code address location 34DD of Table 2. The first source statement of line number 4000 prints on the output of the terminal device 92 a request for a selection number, and the second source statement corresponding to block 568 reads from the terminal 92 the selection number into the input variable S. At block 568 corresponding to machine code address location 3511 of Table 2, the interrupt vector is enabled, and at machine code address location 3518 the program goes to line number 2005 to locate the selection desired and to play the selection as previously discussed in connection with the "P" command.

If the exit command "X" is chosen, the program goes to line number 3000 of block 572 corresponding to machine code address location 34DA of Table 2 calling the exit routine thereby terminating the program.

It can thus be seen that the record program of FIG. 11 rewinds the tape to the starting position and counts the tape intervals to the start of each selection to be recorded. This process eliminates any errors which might be caused if a tape count interrupt were missed during the recording of one selection. Thus, such an error would not require the rerecording of an entire tape as otherwise might be necessary. Also, this routine allows a user to change the selections recorded on the tape one at a time without requiring that all recordings be changed if only the album displayed in a display rack 14 of the device 10 was changed.

As will be understood by those skilled in the art, several of the functions of the subroutines from machine code address location 336B to machine code address location 3481 of the main program of Table 1 could be implemented by hardware changes, and the blinking of the selection indicator lights 18 could be accomplished by hardware control rather than the software as explained in connection with FIG. 7. Also, each of the selection switches 16 could be connected to a hardware decode circuit for providing an address of the switch 16 activated directly to the microprocessor 30 rather than polling the switch recognition control circuit 86 after each interrupt to establish the switch location of the selection switch activated as discussed in connection with FIG. 10.

Also, a timing circuit may optionally be added to the circuit for monitoring the output of the position pulses from the tape unit 68, and for generating an interrupt signal to the program for resetting the entire system to the start of block 200 of the main program if a position pulse is not received within a set time period, for instance every two seconds. This helps assure that such things as power line glitches and intermittent processor and hardware problems do not easily down the system.

Thus there has been shown and described a novel record and display merchandising device having an electronic control for playing selected portions of records displayed therein which fulfills all of the objects and advantages sought therefor. It will be apparent to those skilled in the art, however, that many changes, modifications, variations, and other uses and applications for the subject device are possible. All such changes, modifications, variations and other uses and applications which do not depart from the spirit and scope of the invention are deemed to be covered by the invention which is limited only by the claims which follow.

TABLE I

MICROWARE A/BASIC COMPILER V2.1F

```
1000      REM TPAPP 7/26/80
1000      REM COPYRIGHT (C), 1979
1000      REM APPLIED ELECTRONICS CORPORATION
1000      REM ST. LOUIS, MISSOURI
1000      OPT S
1000      REM
1000      REM A=LAST COMMAND
1000      REM B=PRESENT SELECTION DESIRED COUNT LOCATION
1000      REM C=PRESENT COUNT
1000      REM H=CHANNEL NUMBER
1000      REM D=PRESENTLY PLAYING SELECTION NUMBER
1000      REM F=SELECTION COUNT
1000      REM G=PRESENT SELECTION LIGHT CLEARED FLAG
1000      REM Y=TEMP STORAGE
1000      REM X=TEMP STORAGE
1000      REM P=NUMBER OF COMMANDS IN QUE
1000      REM I=COUNTER
1000      REM J=COUNTER
1000      REM K=COUNTER DURING INTERRUPT
1000      REM L=COUNTER DURING INTERRUPT
```

```
1000      REM M=START OF SELECTION
1000      REM N=STOP OF SELECTION, COMPENSATED
1000      REM Q=CLOSE TO PLAY FLAG
1000      REM Z=INTERRUPT TEMPORARY STORAGE
1000      REM T=INTERRUPT TEMPORARY STORAGE
1000      REM R=OLD COMMAND PATTERN
1000      REM S=NEW COMMAND PATTERN
1000      REM U=PRESENT QUE PATTERN
1000      REM V=PRESENT PLAY PATTERN
1000      REM W=INTERRUPT TEMPORARY STORAGE
1000      REM Q=COMMAND QUE
1000      BASE=$0030
1000      DIM X(1),A(1),C(1),Q(20),P(1),H(1),U(5),V(5),D(1),G(1),O(1)
1000      DIM Z(1),R(4),S(4),L(1),W(1),Y(1),T(1),F(1),M(1),N(1),A1(1)
1000      ORG=$3000
3000      REM
3000      REM INITIALIZE VARIABLES
3000      X=0 : J=0 : A=0 : C=0 : P=0 : H=0 : Y=0 : D=0 : N=0 : O=0
303C      FOR I=1TO20 : Q(I)=0 : NEXT I
307B      Z=0 : E=0 : K=0 : L=0 : W=0 : Y=0 : T=0 : V=0 : G=0 : A1=0
30B7      FOR I=1TO4 : R(I)=0 : S(I)=0 : NEXT I
310D      FOR I=1TO5 : V(I)=0 : U(I)=0 : NEXT I
3163      REM INITIALIZE POINTERS
3163 0001 STACK=$00FF
3166      ON IRQ GOTO 10000
316C      REM
316C      GOSUB 1620 : REM DELAY 1SEC
316F      REM INITIALIZE PIA
316F      POKE($8801)=0 : REM ENABLE ACCESS TO ADDR
3174      POKE($8800)=0 : REM ADATA ALL INPUTS
3179      POKE($8801)=$14 : REM CA1 TRUE LOW, CA2 TRUE HIGH
317F      REM
317F      POKE($8803)=0 : REM ENABLE ACCSS TO BDDR
3184      POKE($8802)=$FF : REM BDATA ALL OUTPUTS
318A      POKE($8803)=$2C : REM CA1 TRUE LOW, CA2 OUT TRUE LOW
3190      REM
3190      REM INITIALIZE CMTRK REGISTERS
3190      FOR I=$00TO$70STEP$10 : POKE($8802)=I : NEXT I
31C5      REM
31C5      REM ***********************************************************
31C5      REM TURN ON RECORDER AT BOT & PLAY
31C5      GOSUB 1000 : GOSUB 1620 : REM PLAY 1SEC
31CB      GOSUB 1050 : REM FAST REWIND
31CE 0002 X=PEEK($8800) : REM CLEAR ANY INTERRUPTS
31D6      FOR I=1TO6500 : NEXT I : IF PEEK($8801)&$40=$40THEN2
3213      C=0 : GOSUB 1040 : REM FAST FORWARD
321C      POKE($8801)=$1C : IRQ ON : REM ENABLE COUNT INTERRUPTS
3223 0004 IF C<=3600THEN4 : POKE($8801)=$1D : REM ON AT BEGINNING
323B 0005 GOSUB 1000 : IF H<>1THEN6 : POKE($8802)=$78 : H=2 : GOTO10
325E 0006 POKE($8802)=$74 : H=1
326B      REM TURN ON LIGHTS ACCORDING TO PRESENT COMMAND QUE
326B 0010 GOSUB 1550
326E      FOR I=1TO20 : X=Q(I) : REM ESTABLISH NEW QUE PATTERN
328D      GOSUB 1500
3290 0060 NEXT I
32AA      GOSUB 1600
32AD      REM DELAY APPROX 1 SECOND
32AD      GOSUB 1300
32B0      REM ARE WE PLAYING DESIRED SELECTION?
32B0      REM IF WE ARE THEN BLINK OFF PRESENT SELECTION LIGHT.
32B0      FOR I=1TO5 : IF V(I)=0THEN80 : IF G=0THEN80
32E7      POKE($8802)=(U(I)%V(I)&U(I))!(U(I)&$F0) : G=0
3343 0080 NEXT I
335D      G=D : GOSUB 1300 : GOTO 10
336B      REM
336B      REM ***********************************************************
336B      REM SUBROUTINES
336B 1000 REM TAPE CONTROL DRIVER FOR PLAY
336B      IF A=$68 THEN 1005
337B      GOSUB 1030 : REM STOP
337E      A=$68 : GOSUB 1060 : REM PLAY
3388      E=PEEK($8800)
3390      FOR E=1TO7280 : NEXTE : REM 280 MSEC
33B9      A1=A
33C1 1005 RETURN
33C2 1030 REM TAPE CONTROL DRIVER FOR STOP
33C2      IF A=$64 THEN 1035
33D2      A=$64 : GOSUB 1060 : REM STOP
33DC 1035 RETURN
33DD 1040 REM TAPE CONTROL DRIVER FOR FAST FORWARD
33DD      IF A=$62 THEN 1045
33ED      A=$62 : GOSUB 1060 : REM FAST FORWARD
33F7      A1=A
33FF 1045 RETURN
3400 1050 REM TAPE CONTROL DRIVER FOR FAST REWIND
3400      IF A=$61 THEN 1055
3410      A=$61 : GOSUB 1060 : REM FAST REWIND
341A      A1=A
3422 1055 RETURN
3423 1060 REM TAPE DRIVE CONTROL PULSE
3423      POKE($8802)=A
342A      FOR E=1 TO 130 : NEXT E : REM 5MS PULSE
3452      POKE($8802)=$60
3458      FOR E=1 TO 3120 : NEXT E : REM 120MS DELAY
```

```
3481         RETURN
3482         REM TO ADD COMMAND TO QUE(20MAX)
3482  1100   P=P+1 : Q(P)=T : RETURN
34A8         REM
34A8         REM TO FIND BIT PATTERN
34A8  1200   Y=1 : FOR J=1TO4 : IF X=JTHEN1210 : Y=Y+Y : NEXT J
34F3  1210   RETURN
34F4         REM
34F4         REM MONITOR RECORDER STATUS & DELAY FOR PROPER BLINK RATE
34F4  1300   FOR I=1TO400 : REM ADJUSTS BLINK RATE
3503         IF D<>0THEN1320 : REM IF PRESENTLY PLAYING SELECTION GOTO
3513         IF Q(1)<>0THEN1350 : REM IF ANY UNPLAYED SELECTION(S) GOTO
352B  1305   IF C>8054 THEN 1 : REM IF END OF TAPE GOTO
353D  1310   NEXT I : RETURN
3558         REM END OF SELECTION?
3558  1320   O=0 : IF Q(1)>10THEN1330 : IF C<M+425-(Q(1)*9)THEN1305 : GOTO1340
35BD  1330   IF C<(M+425)-((Q(1)-10)*9) THEN 1305
3603  1340   IF P=<1THEN1345
3615         POKE($8802)=$70 : REM TURN OFF CHANNELS @ END OF SELECTION
361B         REM POP QUE FIFO
361B  1345   FOR J=1TO20 : Q(J)=Q(J+1) : NEXT J : Q(20)=0 : P=P-1 : D=0
3691         GOTO1305
3694         REM
3694         REM FIND DESIRED SELECTION
3694  1350   POKE($8802)=$51 : REM TURN ON SEARCH LIGHT
369A         IF P=0THEN1355
36AA         POKE($8802)=$70 : REM TURN OFF AUDIO I/O CHANNELS
36B0  1355   IF Q(1)=<0 THEN 1310
36CA         IF Q(1)>10 THEN 1360 : M=((Q(1)-1)*450)+3600 : GOTO1370
370B  1360   M=((Q(1)-11)*450)+3600 : REM M=START OF SELECTION
372F  1370   IFC<MTHEN1380 : IF O<>0THEN1380 : GOSUB 1050 : GOTO1310
3752  1380   IF C>M-5THEN1390 : GOSUB 1040 : GOTO 1310 : REM FAST FWD
377B  1390   O=1 : GOSUB 1000 : REM START PLAY
3785         IF C>=MTHEN1410 : GOTO1310 : REM WAIT TILL CLOSE
3795         REM SET TO TOP OF QUE, CALCULATE CHANNEL &TURN ON.
3795  1410   POKE($8802)=$50 : REM TURN LEDS OFF
379B         D=Q(1) : IF Q(1)>10THEN1420 : POKE($8802)=$74 : GOTO1310
37CE  1420   POKE($8802)=$78 : GOTO1310 : REM PLAY CHANNEL 2
37D7         REM
37D7         REM
37D7  1500   REM SUBROUTINE TO ESTABLISH CONTROL PATTERN
37D7         IF X=0THEN1525
37E7         IF X>4THEN1505 : GOSUB1200 : U(1)=U(1)!Y&$0F : GOTO1525
3827  1505   IFX>8THEN1510 : X=X-4 : GOSUB1200 : U(2)=U(2)!Y&$0F!$10
3874         GOTO1525
3877  1510   IFX>12THEN1515 : X=X-8 : GOSUB1200 : U(3)=U(3)!Y&$0F!$20
38C4         GOTO1525
38C7  1515   IFX>16THEN1520 : X=X-12 : GOSUB1200 : U(4)=U(4)!Y&$0F!$30
3914         GOTO1525
3917  1520   X=X-16 : GOSUB1200 : U(5)=U(5)!Y&$0F!$40
3952  1525   IF I>1THEN1530 : FOR J=1TO5 : V(J)=U(J) : NEXTJ
39AE  1530   RETURN
39AF  1550   REM SUBROUTINE TO CLEAR QUE BITS
39AF         FOR I=1TO5 : U(I)=0 : V(I)=0 : NEXT I
3A05         RETURN
3A06         REM
3A06  1600   FOR I=1TO5 : IF U(I)=0THEN1610 : POKE($8802)=U(I)
3A3D  1610   NEXT I
3A57         RETURN
3A58  1620   REM SUBROUTINE TO DELAY 1SEC
3A58         FOR I=1TO26000 : NEXTI
3A81         RETURN
3A82         REM
3A82         REM ******************************************************************
3A82         REM INTERRUPT HANDLER
3A82  9000   IRQ OFF : Z=PEEK($8801)&$C0 : T=PEEK($8800)
3A98         IF Z&$40=$40THEN10100 : REM GOTO COUNT INTERRUPT ROUNTINE
3AAC  9010   IF Z&$80=$80THEN10200 : REM GOTO KEY PRESSED INTERRRUPT ROUTINE
3AC0  9020   IRQ ON : RETI
3AC2         REM COUNT INTERRUPT ROUTINE
3AC2  9100   IF A1=$61THEN10150 : C=C+1 : GOTO10000
3AE1  9150   C=C-1 : GOTO10000
3AF0         REM KEY PRESSED INTERRUPT ROUTINE
3AF0  9200   FOR K=1TO4 : R(K)=S(K) : NEXT K : REM DELEGATE TO OLD PATTERN
3B3A         L=0 : FOR K=$80TO$B0STEP$10 : POKE($8802)=K : POKE($8803)=$34
3B62         L=L+1 : S(L)=PEEK($8800)&$3F : POKE($8803)=$2C : NEXT K
3BAB         S(4)=S(4)&$03
3BCF         FOR K=1TO4 : IF S(K)<>0 THEN 10205 : NEXT K : GOTO 10000
3C13         REM DECODE NEW COMMAND(S)
3C13         FOR L=1TO4 : W=(L-1)*6
3C38  9210   Z=(S(L)%R(L))&S(L) : IF Z<>0THEN10230
3C85  9215   NEXT L : IFD=0THEN10000 : IFQ(P)<>Q(1)THEN10000
3CDD         Q(P)=0 : IF P=<1THEN10000
3D06         POKE($8802)=$70
3D0C  9218   FOR K=1TO20 : Q(K)=Q(K+1) : NEXTK : Q(20)=0 : P=P-2 : D=0
3D82         FOR K=1TO4 : S(K)=0 : NEXT K
3DC1         GOTO 10000
3DC4  9230   T=Z&$01 : IF T=0THEN10240 : T=1+W : GOSUB 1100
3DEE  9240   T=Z&$02 : IF T=0THEN10250 : T=2+W : GOSUB 1100
3E18  9250   T=Z&$04 : IF T=0THEN10260 : T=3+W : GOSUB 1100
3E42  9260   T=Z&$08 : IF T=0THEN10270 : T=4+W : GOSUB 1100
3E6C  9270   T=Z&$10 : IF T=0THEN10280 : T=5+W : GOSUB 1100
3E96  9280   T=Z&$20 : IF T=0THEN10290 : T=6+W : GOSUB 1100
3EC0  9290   GOTO 10215
3EC3         END
```

```
LOAD MAP:

MUL 3EC3
IND 3F43

ERRORS  000
VAR LEN  $0084
PGM LEN  $0F4E
PGM END  $3F4D

X    0030 01 00
A    0032 01 00
C    0034 01 00
Q    0036 14 00
P    005E 01 00
H    0060 01 00
U    0062 05 00
V    006C 05 00
D    0076 01 00
G    0078 01 00
O    007A 01 00
Z    007C 01 00
R    007E 04 00
S    0086 04 00
L    008E 01 00
W    0090 01 00
Y    0092 01 00
T    0094 01 00
F    0096 01 00
M    0098 01 00
N    009A 01 00
A1   009C 01 00
J    009E 00 00
     00A0 00 00
     00A2 00 00
E    00A4 00 00
K    00A6 00 00
I    00A8 00 00
     00AA 00 00
     00AC 00 00
     00AE 00 00
K    00B0 00 00
     00B2 00 00
```

TABLE II

MICROWARE A/BASIC COMPILER V2.1F

```
1000         REM RCRD - COPYRIGHT, COMPUTRAK - 7/28/80
1000         REM APPLIED ELECTRONICS COPORATION
1000         REM DBA AMERICAN DATA COMPANY
1000         OPT S
1000         REM
1000         REM Z=INTERRUPT TEMP STORAGE
1000         REM T=INTERRUPT TEMP STORAGE
1000         REM C=PRESENT COUNT
1000         REM S=DESIRED SELECTION
1000         REM M=CALCULATED SELECTION START COUNT
1000         REM N=CALCULATED SELECTION STOP COUNT COMPENSATED
1000         REM O=CLOSE TO PLAY FLAG
1000         REM X=COMMAND
1000         REM A=LAST COMMAND
1000         REM A$=OPERATOR COMMAND
1000         BASE=$5000
1000         DIM Z(1),T(1),C(1),S(1),M(1),X(1),A(1),A$(2),N(1),O(1),A1(1)
1000         ORG=$3000
3000         Z=0 : T=0 : C=0 : S=0 : M=0 : X=0 : A=0 : A(1)=0 : A(2)=0 : N=0 : A1=0
3074         O=0
307C         STACK=$6FFF
307F         POKE($800D)=0 : POKE($800C)=0 : POKE($800D)=$14
308F         POKE($800F)=0 : POKE($800E)=$FF : POKE($800F)=$2C
30A0         FOR I=$00TO$70STEP$10 : POKE($800E)=I : NEXT I
30E5         ON IRQ GOTO 9000
30EB         REM
30EB         REM
30EB         REM ***************************************************************
30EB         REM MAINLINE PROGRAM
30EB  0004   POKE($800E)=$73 : REM DISABLE HEADS & CHANNELS
30F1         IRQ OFF
30F3         GOSUB 7030
30F6         PRINT : PRINT "*** COMPUTRAK UTILITY ***" : PRINT
3124         PRINT "R      RECORD"
313F         PRINT "P      PLAY(FROM ZERO POINT)"
3169         PRINT "PL     PLAY(FROM RELATIVE POINT)"
3197         PRINT "X      EXIT" : PRINT
31B3  0006   PRINT "COMMAND"; : INPUT A$
31D7         GOTO 100
31DA  0010   REM REWIND TAPE TO START
31DA         GOSUB 7000 : GOSUB 1620 : REM PLAY 1S
31E0         GOSUB 7050
31E3         PRINT "INPUT SELECTION NUMBER"; : INPUT S
3217  0012   T=PEEK($800C)
3221         FOR I=1TO6500 : NEXTI : IF PEEK($800D)&$40<>0 THEN 12
3268         C=0 : GOSUB 7040 : REM FAST FORWARD
3273         POKE($800D)=$1C : IRQ ON : REM ENABLE COUNT INTERRUPTS
```

```
327A 0014  IF C<=3600 THEN 14 : POKE($800D)=$1D
3294       GOSUB 7000
3297 0016  IF C<=3700 THEN 16
32AB       RETURN
32AC 0100  IF A$="PL"THEN 4000
32D9       IF A$="R"THEN1000 : IF A$="P"THEN2000 : IF A$="X"THEN3000 : GOTO4
3360       REM
3360       REM RECORD AT SELECTION
3360 1000  PRINT
3360       GOSUB 10
3363       GOSUB 8020 : REM LOCATE DESIRED SELECTION
3366       IF S>10THEN1010 : POKE($800E)=$72 : N=M+425-(S*9) : GOTO1015
33B4 1010  POKE($800E)=$71 : N=(M+425)-((S-10)*9) : REM TURN ON HEAD 2
33EC 1015  POKE($800E)=$52 : REM TURN ON RECORD IND
33F2 1020  O=0 : IF C<NTHEN1020
340B       POKE($800E)=$73 : REM TURN OFF HEADS
3411       POKE($800E)=$50 : REM TURN OFF RECORD & SEARCH INDICATORS
3417       GOTO 4
341A 1620  REM SUB TO DELAY 1 SEC
341A       FOR I=1TO26000 : NEXTI
344D       RETURN
344E       REM PLAY SELECTION
344E 2000  GOSUB 10
3451 2005  GOSUB 8020 : REM LOCATE SELECTION
3454       IF S>10THEN2010 : POKE($800E)=$76 : N=M+425-(S*9) : GOTO 2020
349F 2010  POKE($800E)=$79 : N=(M+425)-((S-10)*9) : REM TURN ON CH2
34D7 2020  GOTO 1020
34DA       REM EXIT
34DA 3000  CALL $E0D0
34DD       REM
34DD 4000  PRINT "INPUT SELECTION NUMBER"; : INPUT S
3511       POKE($800D)=$1C : IRQ ON
3518       GOTO 2005
351B       REM SUBROUTINES
351B 7000  REM TAPE CONTROL DRIVER FOR PLAY
351B       IF A=$68 THEN 7005
352D       GOSUB 7030 : REM STOP
3530       A=$68 : GOSUB 7060 : REM PLAY
353C       FOR E=1TO7280 : NEXT E : REM 280 MSEC
356F       A1=A
357B       E=PEEK($800C)
3585 7005  RETURN
3586 7030  REM TAPE CONTROL DRIVER FOR STOP
3586       IF A=$64 THEN 7035
3598       A=$64 : GOSUB 7060 : REM STOP
35A4 7035  RETURN
35A5 7040  REM TAPE CONTROL DRIVER FOR FAST FORWARD
35A5       IF A=$62 THEN 7045
35B7       A=$62 : GOSUB 7060 : REM FAST FORWARD
35C3       A1=A
35CF 7045  RETURN
35D0 7050  REM TAPE CONTROL DRIVER FOR FAST REWIND
35D0       IF A=$61 THEN 7055
35E2       A=$61 : GOSUB 7060 : REM FAST REWIND
35EE       A1=A
35FA 7055  RETURN
35FB 7060  REM TAPE DRIVE CONTROL PULSE
35FB       POKE($800E)=A
3604       FOR E=1TO130 : NEXTE : REM 5MS PULSE
3636       POKE($800E)=$60
363C       FOR E=1TO3120 : NEXTE : REM 120 MSEC
366F       RETURN
3670       REM
3670       REM LOCATE SELECTION
3670 8020  POKE($800E)=$51 : REM TURN ON SEARCH LIGHT
3676       IF S>10THEN8030 : M=((S-1)*450)+3600 : GOTO8040
36AD 8030  M=((S-11)*450)+3600
36CD 8040  IFC<MTHEN8050 : IF O<>0THEN8050 : GOSUB 7050 : GOTO8040
36F6 8050  IFC>M-5THEN8060 : GOSUB7040 : GOTO8040 : REM START FST F
3723 8060  O=1 : GOSUB 7000 : REM START PLAY
372E       IF C>=M THEN 8070 : GOTO 8040
3742 8070  POKE($800E)=$50 : RETURN
3749       REM
3749       REM INTERRUPT HANDLER
3749 9000  Z=PEEK($800D)&$40 : T=PEEK($800C)
3761       IF Z=0THEN9020
3773       IF A1=$61THEN9010 : C=C+1 : GOTO 9000
3798 9010  C=C-1
37A8       GOTO 9000
37AB 9020  RETI
37AC       END

LOAD MAP:

INP  37AC
OUT  38BC
MUL  39AC
IND  3A2C
ST1  3A37

ERRORS   000
VAR LEN  $01A0
PGM LEN  $0B1D
PGM END  $3B1C
```

```
Z    5000 01 00
T    5002 01 00
C    5004 01 00
S    5006 01 00
M    5008 01 00
X    500A 01 00
A    500C 01 00
A*   500E 00 02
N    5010 01 00
O    5012 01 00
A1   5014 01 00
I    5016 00 00
     5018 00 00
I    501A 00 00
E    501C 00 00
     501E 00 00
IO   5020 00 00
ST   50A1 00 00
```

What is claimed is:

1. A recording-playback device for playing portions of works recorded on a recording medium in a predetermined sequence comprising:

playback means for playing the works recorded sequentially on the recording medium;

control means for controlling said playback means such that the works on said recording medium are played continuously in the predetermined sequence;

selection means operable for selecting for playback out of sequence at least one of the works recorded in sequence on the recording medium;

interruption means responsive to operation of said selection means operable for interrupting the sequential playing of the works on the recording medium by said control means;

locating means responsive to operation of said selection means for locating the selected work on the recording medium whereby said selected work is played by said playback means out of said predetermined sequence, and, means to return the recording medium to the place on the recording medium where the interruption occurred so that the playing in sequence of the recorded works can be resumed after the interruption.

2. The recording-playback device of claim 1 including means for displaying phonograph records portions of which are recorded on the recording medium.

3. The recording-playback device of claim 2 including means for visually indicating each phonograph record as the portion thereof recorded on the recording medium is being played by said playback means.

4. The recording-playback device of claim 1 wherein said selection means include means for selecting a plurality of works to be played out of the predetermined sequence, said means for selecting including means to establish a queue order based on the order in which the selections are made.

5. The recording-playback device of claim 4 wherein said selection means further includes means for playing back the plurality of works in the order selected.

6. The recording-playback device of claim 5 including means associated with said display means for indicating which of said recorded works have been selected.

7. A recording-merchandising device comprising:

display means for displaying a plurality of recorded works offered for sale;

means associated with said device for continuously playing a recording medium having selected portions of said displayed works recorded sequentially thereon;

means associated with said display means operably by a prospective customer for selecting the recorded portion of at least one of said displayed works for playing out of turn;

control means operatively connected to the playing means and to said selection means for controlling which of the recorded portions of works are played, said control means including means for locating on the recording medium a selected recorded portion of a work for playing out of turn and for causing said selected work portion to be played, and;

means to recommence the continuous playing of the recorded sequence after the selected portion of the work is played.

8. The recording-merchandising device of claim 7 including means in said locating means for determining whether said recorded selected work on said recording medium is at or near the present position of said recording medium, and means in said control means for controlling the operation of said playback means responsive to said determination.

9. The recording-merchandising device of claim 7 including means associated with said display means for indicating each recorded work as it is being played.

10. The recording-merchandising device of claim 7 wherein said selection means includes means for selecting the recorded portion of a plurality of displayed works for playback, said selection means including electronic means for establishing the order in which the selected work portions are to be played.

11. The recording-merchandising device of claim 7 wherein said selection means includes associated with said display means for indicating the particular recorded works selected to be played.

12. The recording-merchandising device of claim 7 wherein said locating means includes means for locating the beginning of each selected work portion to be played.

13. The recording-merchandising device of claim 10 wherein said control means includes means operable to prevent successive selections of the same recorded works.

14. The recording-merchandising device of claim 10 wherein said control means includes means to terminate the playing of a recorded work when the same work is again selected during the playing thereof.

15. A device for repeatedly and continuously playing portions of a plurality of recorded works recorded sequentially on a recording medium in a preselected order, said device comprising:

a plurality of display racks for displaying recorded works offered for sale;

a selection switch associated with each of the display racks;

a circuit operatively connected to said selection switches including means responsive to the activation of each of the selection switches;

control means operatively connected to said selection switches and including means for locating the beginning of a specific portion of the recording medium corresponding respectively to each activated selection switch;

playback means operatively connected to said control means for interrupting the playing in sequence of the recorded portions and to place in playing position the specific selected portions of works recorded on the recording medium in the order selected and located by said control means; and, means to revert to the place on the recorded medium where an interruption occurred to resume playing the portions of the recorded works in sequence at the conclusion of the playing of the selected recorded portions.

16. The device of claim 15 including an indicator light associated with each selection switch, and a selection indicator circuit operatively connected to said indicator lights and to the control means, said selection indicator circuit including means to illuminate a respective indicator light associated with each actuated selection switch during playing of the corresponding recorded portion.

17. The device of claim 16 wherein said control means includes means for intermittently illuminating the indicator light associated with each work being played as selected by operation of the corresponding selection switch.

18. The device of claim 15 wherein said control means includes means for storing in memory for playing in order the identity of a plurality of works selected by operation of the corresponding selection switches.

19. The device of claim 18 wherein said control means includes means for energizing the indicator lights associated with the works selected for playing.

20. The device of claim 18 wherein said control means include means to prevent successive storing in memory of the identity of the same work to be played.

21. The device of claim 15 wherein said control means includes means for determining the interval to the beginning of a specific recorded work on the recording medium associated with actuation of the corresponding selection switch, and means for controlling said playback means in one way if the interval is less than a predetermined interval and in a different way if the interval is at least equal to the predetermined interval.

22. The device of claim 15 wnerein said control means includes means for terminating the playing of a selected work when the corresponding selection switch is activated during the playing thereof.

23. A method for playing portions of works recorded on a recording medium in a predetermined sequence comprising:

providing playback means for playing works on the recording medium;

providing control means for controlling said playback means such that the portions of the works recorded on said recording medium are played in the predetermined sequence;

selecting at least one of the works recorded on the recording medium for playing out of sequence;

interrupting the sequential playing of the portions of works recorded on the recorded medium at the conclusion of the playing of the work portion in progress when the selection is made;

locating the selected work portion on the recording medium;

playing the selected work out of the predetermined sequence; and returning the recording medium to the position where the interruption occurred and recommencing the playing of the work portions in the predetermined sequence.

24. The method of claim 23 including providing means for displaying recordings of the individual work portions recorded on the recording medium for sale.

25. The method of claim 24 including providing an indication on the display to identify each recording as the corresponding recorded portion thereof is being played by said playback means.

26. The method of claim 23 including providing means to establish a sequence for playing recorded portions of works selected to be played out of turn from the sequence.

27. The method of claim 26 including means for playing back said selected plurality of recorded works in the order in which they are selected.

28. The method of claim 27 including indicating which of said recorded works have been selected.

29. A recording-merchandising method comprising:

providing means for displaying a plurality of recorded works to be sold;

providing means for playing a recording medium having selectable portions of selected ones of said displayed works recorded thereon in sequence;

providing selection means in association with said display operable by a customer for selecting at least one of said displayed works for playing out of turn in the sequence;

providing control means responsive to said selection means and operatively connected to the means for playing; said control means including means to interrupt the playing of the selected portions in sequence to play a customer selected portion and means for locating the beginning of the customer selected portion and placing the beginning in position to be played; and playing said located recorded portion; and providing means at the conclusion of the playing of the selected portion to return the recording medium to a position to resume playing the sequence of selectable portions at the location where the sequence was interrupted.

30. The recording-merchandising method of claim 29 wherein said locating step includes determining the interval on the recording medium to beginning of that portion of said recording medium at which the customer selected work is recorded, and controlling the operation of said playback means in a first way in response to an interval that is less than a predetermined interval and in a second way in response to an interval that is at least equal to the predetermined interval.

31. The recording-merchandising method of claim 29 including providing means energizeable to identify each displayed work during the time it is being played by the playback means.

32. The recording-merchandising method of claim 29 including providing means to enable a customer to select a plurality of displayed works for playback out of turn, said last named means including means to establish a sequence for the customer selected works to be played out of turn.

33. The recording-merchandising method of claim 32 including indicating the plurality of selected works.

34. The recording-merchandising method of claim 29 wherein said control means includes means to prevent reselection of a customer selected work during the playing thereof.

35. The recording-merchandising method of claim 29 including providing means to terminate the playing of a customer selected recorded portion of a displayed work by said playback means when a customer selected work is again selected during the playing thereof.

36. A recording-playback device for sequentially playing portions of a plurality of works stored on a recording medium comprising:
- a plurality of display racks for displaying a plurality of recorded works;
- selection switches associated respectively with the display racks actuatable by a customer for selecting recorded portions of particular ones of the recorded works for playing back out of turn of the sequence;
- indicator lights associated with the respective display racks energizeable to identify the display rack for each respective recorded work when the corresponding recorded portions thereof is being played;
- a first electric circuit portion including a microprocessor operatively connected to said selection switches whereby an electric signal is supplied to said microprocessor whenever one of the selection switches is actuated, said electric signal being representative of the actuated selection switch;
- a second electric circuit portion operatively connected to said indicator lights and to said microprocessor including means for energizing the indicator lights corresponding respectively to each recorded work portion as it is being played; and,
- memory means in said control circuit operatively connected to said microprocessor for storing a representation of each selected work;
- said microprocessor being programmed to generate signals for energizing the indicator lights and to control said playback means such that selected works stored in the memory means are played back in the order in which they are selected.

* * * * *